(12) United States Patent
Ressel et al.

(10) Patent No.: US 12,460,093 B2
(45) Date of Patent: Nov. 4, 2025

(54) AQUEOUS ELECTROCOATING MATERIALS COMPRISING A SILANE-CONTAINING CROSSLINKER

(71) Applicant: BASF COATINGS GMBH, Münster (DE)

(72) Inventors: Joerg Ressel, Münster (DE); Thorsten Gelbrich, Münster (DE); Justina Muehlmeyer, Münster (DE); Andrea Hoene, Münster (DE); Andre Brosseit, Münster (DE); Nina Wissmann, Münster (DE); Petra Toboll, Münster (DE); Susanne Hemker, Münster (DE); Silke Przybilla, Münster (DE); Martin Geuting, Münster (DE); Janine Juettemeyer, Münster (DE); Dirk Benning, Münster (DE); Hildegund Diekmann, Münster (DE)

(73) Assignee: BASF COATINGS GMBH, Muenster (DE)

(*) Notice: Subject to any disclaimer, the term of this patent is extended or adjusted under 35 U.S.C. 154(b) by 764 days.

(21) Appl. No.: 17/793,971

(22) PCT Filed: Jan. 11, 2021

(86) PCT No.: PCT/EP2021/050338
§ 371 (c)(1),
(2) Date: Jul. 20, 2022

(87) PCT Pub. No.: WO2021/148261
PCT Pub. Date: Jul. 29, 2021

(65) Prior Publication Data
US 2023/0091880 A1   Mar. 23, 2023

(30) Foreign Application Priority Data

Jan. 24, 2020  (EP) .................................... 20153528

(51) Int. Cl.
| | |
|---|---|
| *C09D 7/61* | (2018.01) |
| *C08G 18/22* | (2006.01) |
| *C08G 18/28* | (2006.01) |
| *C08G 18/76* | (2006.01) |
| *C08G 18/79* | (2006.01) |
| *C08G 18/80* | (2006.01) |
| *C09D 5/44* | (2006.01) |
| *C09D 7/63* | (2018.01) |
| *C09D 175/04* | (2006.01) |
| *C25D 13/22* | (2006.01) |

(52) U.S. Cl.
CPC .......... *C09D 5/4465* (2013.01); *C08G 18/227* (2013.01); *C08G 18/283* (2013.01); *C08G 18/289* (2013.01); *C08G 18/7671* (2013.01); *C08G 18/794* (2013.01); *C08G 18/8019* (2013.01); *C08G 18/8029* (2013.01); *C08G 18/8064* (2013.01); *C08G 18/808* (2013.01); *C08G 18/809* (2013.01); *C09D 7/61* (2018.01); *C09D 7/63* (2018.01); *C09D 175/04* (2013.01); *C25D 13/22* (2013.01)

(58) Field of Classification Search
CPC .......... C09D 5/4465; C09D 7/61; C09D 7/63; C09D 175/04; C09D 5/4453; C08G 18/227; C08G 18/283; C08G 18/289; C08G 18/7671; C08G 18/794; C08G 18/8019; C08G 18/8029; C08G 18/8064; C08G 18/808; C08G 18/809; C08G 2170/80; C08G 18/7664; C25D 13/22
See application file for complete search history.

(56) References Cited

U.S. PATENT DOCUMENTS

| | | | |
|---|---|---|---|
| 4,172,822 A | 10/1979 | Patzschke | |
| 4,252,703 A | 2/1981 | Patzschke et al. | |
| 4,780,524 A | 10/1988 | Dobbelstein et al. | |
| 4,824,927 A | 4/1989 | Dobbelstein et al. | |
| 5,147,927 A * | 9/1992 | Baghdachi | C08G 18/10 524/775 |
| 5,324,404 A | 6/1994 | Ott et al. | |
| 5,750,596 A * | 5/1998 | Gam | C09D 163/00 523/415 |
| 6,207,731 B1 * | 3/2001 | Gam | C07F 7/0836 523/435 |
| 6,274,649 B1 | 8/2001 | Ott et al. | |
| 8,815,021 B2 | 8/2014 | Brouwer et al. | |
| 12,331,214 B2 * | 6/2025 | Laas | C09D 175/06 |

(Continued)

FOREIGN PATENT DOCUMENTS

| | | |
|---|---|---|
| DE | 2824418 A1 | 12/1978 |
| DE | 3518732 A1 | 11/1986 |
| DE | 3518770 A1 | 11/1986 |
| EP | 0012463 B1 | 6/1982 |
| EP | 0004090 B2 | 12/1986 |
| EP | 0505445 B1 | 11/1994 |
| EP | 0961797 B1 | 4/2003 |
| JP | 2011057944 A | 3/2011 |
| WO | 2009115504 A1 | 9/2009 |

OTHER PUBLICATIONS

International Search Report and Written Opinion for corresponding PCT/EP2021/050338 mailed Mar. 15, 2021; 11 pages.

(Continued)

*Primary Examiner* — Alicia Bland
(74) *Attorney, Agent, or Firm* — Armstrong Teasdale LLP

(57) ABSTRACT

Described herein are aqueous electrocoating materials including a silane-containing crosslinking agent, a process to produce an electrocoated substrate, an at least partly coated substrate obtained from said process, as well as a component including said at least partly coated substrate.

20 Claims, No Drawings

(56) References Cited

U.S. PATENT DOCUMENTS

| | | | |
|---|---|---|---|
| 2002/0103286 A1* | 8/2002 | Speier | C08G 18/8096 524/492 |
| 2016/0280935 A1 | 9/2016 | Czika et al. | |
| 2016/0297976 A1 | 10/2016 | Herrmann et al. | |
| 2018/0002482 A1* | 1/2018 | Inglefield, Jr. | C08G 63/60 |
| 2018/0112026 A1* | 4/2018 | Laas | C08G 18/022 |
| 2018/0282557 A1* | 10/2018 | Gam | C09D 7/65 |

OTHER PUBLICATIONS

European Search Report for EP Patent Application No. 20153528.3, Issued on Jul. 29, 2020, 3 pages.

Ulrich Zorll, et al., "Rompp Lexikon, Lacke und Druckfarben", 1998, 4 pages.

\* cited by examiner

AQUEOUS ELECTROCOATING MATERIALS COMPRISING A SILANE-CONTAINING CROSSLINKER

CROSS-REFERENCE TO RELATED APPLICATIONS

This application is a U.S. National Phase Application of PCT/EP2021/050338, filed Jan. 11, 2021, which claims the benefit of priority to European Patent Application No. 20153528.3, filed Jan. 24, 2020, the entire contents of which are hereby incorporated by reference herein.

The present invention relates to aqueous electrocoating materials comprising a silane-containing crosslinking agent, a process to produce an electrocoated substrate, an at least partly coated substrate obtained from said process as well as to a component comprising said at least partly coated substrate.

STATE OF THE ART

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose, typically an electrodeposition coating.

The electrodeposition process can be anodic or cathodic; typically, the article to be coated serves as the cathode. Electrodeposition processes are advantageous both economically and environmentally due to the high transfer efficiency of coating resin to the substrate and the low levels of organic solvent, if any, that are employed. Another advantage of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even and continuous coating layer formed over all portions of the metallic substrate provides maximum anticorrosion effectiveness.

Electrocoating baths typically comprise an aqueous dispersion or emulsion of a film-forming material, such as an epoxy resin, having ionic stabilization. A dispersion is typically a two-phase system of one or more finely divided solids, liquids, or combinations thereof in a continuous liquid medium such as water or a mixture of water and organic cosolvent. An emulsion is a dispersion of liquid droplets in a liquid medium, preferably water or a mixture of water and various cosolvents. Accordingly, an emulsion is a type of dispersion.

For automotive or industrial applications, the electrocoat compositions are formulated to be curable compositions by using self-crosslinking resins or including a crosslinker. During electrodeposition, a coating composition containing an ionically-charged resin is deposited onto a conductive substrate by submerging the substrate in an electrocoating bath having dispersed therein the charged resin and then applying an electrical potential between the substrate and a pole of opposite charge, for example, a stainless-steel electrode. The charged coating particles are plated or deposited onto the conductive substrate and the coated substrate is then heated to cure the coating.

Suitable automotive metals include cold rolled steel ("CRS"), electrogalvanized steel ("EGS"), hot dipped galvanized steel ("HDG"), galvanneal (annealed hot-dipped galvanized steel), aluminum and aluminum alloys, and other zinc-alloy coated metals. In order to improve adhesion of the electrocoat to the metal surface, the metal is typically treated with a zinc phosphate conversion coating. Zinc phosphate conversion coatings typically contain nickel which is environmentally undesirable and toxic. Recently, various techniques for eliminating the use of toxic compounds have been proposed. In particular, various silane coatings have been developed for preventing corrosion of metal substrates.

Continuing problems with cathodic electrocoating compositions have been the lack of smoothness in the cured finish, the presence of craters in the cured finish, and the lack of adhesion and edge protection or edge coverage of the substrate. It is known in the state of the art to improve adhesion on the substrate, especially substrates previously treated with silane coatings, by addition of silane compounds to electrocoating compositions. In general, the silane compounds can either be added directly to the aqueous electrocoating material or the resins used in the electrocoating materials can be modified with alkoxy silanes. However, direct addition of alkoxy-silanes to aqueous electrocoating dispersions or bath results in coagulation because the silane will be hydrolyzed in the aqueous dispersion, thus resulting in crosslinking reactions during preparation and storage of the aqueous electrocoating dispersion or bath material. Direct silane modification of the resins used in the electrocoating dispersions with alkoxy-silanes will also result in reduced storage stability of the electrocoating bath material due to the hydrolysis and crosslinking reactions previously described.

Of advantage accordingly would be an electrocoating material which would result in an improved adhesion and mechanical strength of the electrocoating layer on the substrate. Moreover, an excellent edge protection of the substrate should be achieved with said electrocoating material. Additionally, it is desirable that the material can be cured at low temperatures to save energy and guarantee a cost-efficient electrocoating process. The improvement in adhesion, mechanical strength and edge protection should, however, not result in a negative influence on the storage stability or the deposition process of the electrocoating material.

Object

The object of the present invention, accordingly, was that of providing an aqueous electrocoating material resulting in cured electrocoating layers with improved adhesion to the substrate as well as improved edge coverage and improved edge protection of the substrate. Moreover, cured layers obtained from the aqueous electrocoating material should have a high mechanical strength and sufficient surface smoothness. Additionally, the aqueous electrocoating materials should have a high storage stability, an adequate particle size, filterability and electrochemical deposability.

Technical Solution

The objects described above are achieved by the subject matter claimed in the claims and also by the preferred embodiments of that subject matter that are described in the description hereinafter.

A first subject of the present invention is therefore an aqueous electrocoating material (ECM), comprising—based on the total weight of the electrocoating material—
- (a) at least one binder (B) containing cationic or anionic groups and reactive functional groups which are able to undergo crosslinking reactions with complementary reactive functional groups present in a crosslinking agent (CA),
- (b) at least one crosslinking agent (CA) containing fully blocked isocyanate groups and at least one silane group;
- (c) at least 100 ppm bismuth;
- (d) at most 300 ppm of dissolved lithium; and
- (e) optionally at least one additive (AD);

characterized in that
the at least one crosslinking agent (CA) is prepared by
- (i) reacting 0.01 to 5 mol-% of the total amount of free isocyanate groups present in at least one parent structure P with at least one compound of general formula (I)

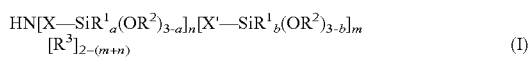

$$HN[X\!-\!SiR^1_a(OR^2)_{3-a}]_n[X'\!-\!SiR^1_b(OR^2)_{3-b}]_m[R^3]_{2-(m+n)} \quad (I)$$

wherein
- X, X' represent, independently from each other, linear and/or branched alkylene or cycloalkylene radicals having 1 to 20 carbon atoms;
- $R^1$ represents an alkyl, cycloalkyl, aryl, or aralkyl group, it being possible for the carbon chain to be interrupted by nonadjacent oxygen, sulfur, or $NR_a$ groups, where $R_a$ is alkyl, cycloalkyl, aryl, or aralkyl;
- $R^2$ represents hydrogen, an alkyl, or a cycloalkyl group, it being possible for the carbon chain to be interrupted by nonadjacent oxygen, sulfur or $NR_a$ groups, where $R_a$ is alkyl, cycloalkyl, aryl, or aralkyl;
- $R^3$ represents a linear and/or branched alkylene or cycloalkylene radicals having 1 to 20 carbon atoms;
- n,m are, independently from each other, 1 or m is 1 and n is 0; and
- a,b are, independently from each other 0 to 2;

(ii) reacting the free isocyanate groups of the parent structure P remaining after step
- (i) with at least one blocking agent BA to obtain the crosslinking agent (CA) comprising fully blocked isocyanate and silane groups; and (iii) optionally diluting the crosslinking agent (CA) obtained in step (ii) with at least one solvent.

The above-specified aqueous electrocoating material is hereinafter also referred to as aqueous electrocoating material of the invention and accordingly is a subject of the present invention. Preferred embodiments of the aqueous electrocoating material of the invention are apparent from the description hereinafter and also from the dependent claims.

In light of the prior art it was surprising and unforeseeable for the skilled worker that the object on which the invention is based could be achieved by using a fully blocked NCO-crosslinking agent (CA) in which a rather low amount of isocyanate groups are functionalized with a specific silane compound. This hydrophobic crosslinking agent (CA) can be mixed directly with the principle aqueous cationic resin because hydrolysis and/or condensation reactions of the silane functions are prevented until curing of the coating layer due to the formation of micelles containing the hydrophobic crosslinking agent (CA). Thus, the inventive aqueous electrocoating materials have an excellent storage stability.

In contrast, direct addition of silane compounds to aqueous electrocoating materials or functionalization of cationic binders with silane compounds leads to hydrolysis and/or condensation reactions of the silane groups, thus resulting in crosslinking reactions and therefore a decreased storage stability. The use of these low amounts of silane groups in the crosslinking agent (CA) leads to excellent adhesion of the cured electrocoating material on the substrate, thus resulting in improved corrosion resistance under acidic conditions and alternating climate conditions. Additionally, an excellent edge protection is obtained by using said crosslinking agent (CA). However, the presence of the silane-containing crosslinking agent (CA) does not negatively influence the production process, particle size and filterability as well as the deposition process of the inventive aqueous electrocoating materials.

A further subject of the present invention is a method for at least partly coating an electrically conductive substrate with an electrocoat material, comprising contacting the electrically conductive substrate, with the inventive aqueous electrocoating material (ECM)
- in a first step (1a) at an applied voltage in a range from 1 to 50 V, which is applied over a duration of at least 5 seconds, and
- in a subsequent second step (1b) at an applied voltage in a range from 50 to 400 V, with the proviso that the voltage applied in stage (1b) is greater by at least 10 V than the voltage applied in stage (1a).

Yet another subject of the present invention is an at least partly coated substrate obtained by the inventive method.

A final subject of the present invention is an article or component comprising the inventive at least partly coated substrate.

DETAILED DESCRIPTION

The measurement methods to be employed in the context of the present invention for determining certain characteristic variables are evident from the Examples section. Unless explicitly indicated otherwise, these measurement methods are to be used for determining the respective characteristic variable.

If reference is made in the context of the present invention to an official standard, this of course means the version of the standard that was current on the filing date, or, if no current version exists at that date, then the last current version.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

Aqueous Electrocoating Material (ECM):

The first subject-matter of the present invention is an aqueous electrocoating material (ECM) containing at least one binder (B), at least one silane-containing fully blocked NCO-crosslinking agent (CA), at least 100 ppm of bismuth, not more than 300 ppm of dissolved lithium and optionally at least one additive (AD).

The expression "aqueous electrocoating material" is known to the skilled person and refers to an electrocoating material which is not based exclusively on organic solvents. "Aqueous" in the context of the present invention should be understood preferably to mean that the electrocoating material comprises a water fraction of at least 20 wt. %, preferably at least 25 wt. %, very preferably at least 50 wt. %, based in each case on the total amount of the solvents present (that is, water and organic solvents). The water fraction in turn is preferably 60 to 100 wt. %, more particularly 65 to 90 wt. %, very preferably 70 to 85 wt. %, based in each case on the total amount of the solvents present.

Binder (B):

As first mandatory component, the aqueous electrocoating material (ECM) comprises at least one binder (B), containing cationic or anionic groups and reactive functional groups which are able to undergo crosslinking reactions with the complementary reactive functional groups present in the at least one crosslinking agent (CA). Said complementary reactive functional groups are—on the one hand—thermally deblocked isocyanate groups and—on the other hand—silane groups introduced by the compound of general formula (I). The term "binder" in the sense of the present invention and in agreement with DIN EN ISO 4618 (German version, date: March 2007), refers preferably to those nonvolatile fractions of the composition of the invention that are responsible for forming the film, with the exception of any pigments and fillers therein, and more particularly refers to the polymeric resins which are responsible for film formation. The nonvolatile fraction may be determined by the method described in the Examples section.

The binder (B) may be self-crosslinking and/or externally crosslinking. Self-crosslinking binders contain reactive functional groups which are able to undergo thermal crosslinking reactions with themselves and/or with complementary reactive functional groups in the self-crosslinking binders. In contrast, externally crosslinking binders contain reactive functional groups which are able to undergo thermal crosslinking reactions with complementary reactive functional groups in crosslinking agents CA.

The amount of the at least one binder (B) in the EC materials of the invention is guided in particular by its solubility and its dispersibility in the aqueous medium as well as by its functionality with regard to the crosslinking reactions with itself or with the crosslinking agent (CA), and may therefore be determined readily be the skilled worker on the basis of his or her general art knowledge. Preferably, the at least one binder (B) is present in a total amount of 50 to 90% by weight—based on solid content of the aqueous electrocoating material (ECM).

If the at least one binder (B) is used in cathodically depositable electrocoating materials (ECM), it contains potentially cationic and/or cationic groups. Examples of suitable potentially cationic groups which can be converted into cations by neutralizing agents and/or quaternizing agents are primary, secondary or tertiary amino groups, secondary sulfide groups or tertiary phosphine groups, especially tertiary amino groups or secondary sulfide groups. Examples of suitable cationic groups are primary, secondary, tertiary or quaternary ammonium groups, tertiary sulfonium groups or quaternary phosphonium groups, preferably quaternary ammonium groups or tertiary sulfonium groups, but especially quaternary ammonium groups.

Examples of suitable neutralizing agents for the potentially cationic groups are inorganic and organic acids such as sulfuric acid, hydrochloric acid, phosphoric acid, formic acid, acetic acid, lactic acid, dimethylolpropionic acid or citric acid, especially formic acid, acetic acid or lactic acid.

Examples of suitable binders (B) for cathodically depositable electrocoat materials are known from the state of the art. These are preferably resins containing primary, secondary, tertiary or quaternary amino or ammonium groups and/or tertiary sulfonium groups and having amine numbers of preferably between 20 and 250 mg KOH/g and a weight-average molecular weight of from 300 to 10 000 Daltons. In particular, use is made of amino (meth)acrylate resins, amino epoxy resins, amino epoxy resins with terminal double bonds, amino epoxy resins with primary and/or secondary hydroxyl groups, amino polyurethane resins, amino-containing polybutadiene resins or modified epoxy resin-carbon dioxide-amine reaction products.

Alternatively, the binder (B) may comprise anionic and/or potentially anionic groups. Binders of this kind are used in anionically depositable electrocoat materials. Examples of suitable potentially anionic groups which can be converted into anions by neutralizing agents are carboxylic, sulfonic or phosphonic acid groups, especially carboxylic acid groups. Examples of suitable anionic groups are carboxylate, sulfonate or phosphonate groups, especially carboxylate groups.

Examples of suitable neutralizing agents for the potentially nonionic groups are ammonia, ammonium salts, such as ammonium carbonate or ammonium hydrogen carbonate, for example, and also amines, such as trimethylamine, triethylamine, tributylamine, dimethylaniline, diethyl aniline, triphenylamine, dimethylethanolamine, diethylethanolamine, methyldiethanolamine, triethanolamine, and the like.

The amount of neutralizing agent is generally chosen such that from 1 to 100 equivalents, preferably from 50 to 90 equivalents, of the potentially cationic or potentially anionic groups of a binder (B) are neutralized.

Examples of suitable binders (B) for anionically depositable electrocoat materials are known from German patent application DE 28 24 418 A1. They are preferably polyesters, epoxy resin esters, poly(meth)acrylates, maleate oils or polybutadiene oils having a weight-average molecular weight of from 300 to 10 000 Daltons and an acid number of from 35 to 300 mg KOH/g.

Particularly preferred aqueous coating materials (ECM) are cathodically depositable and thus comprise at least one binder (B) having cationic groups as described before. With particular preference the binder (B) has tertiary amino groups optionally present at least partly in protonated form, very preferably tertiary amino groups which in each case independently of one another have at least two $C_1$-$C_3$ alkyl groups each substituted at least singly by a hydroxyl group, more particularly having in each case independently of one another two hydroxyethyl groups, two hydroxypropyl groups, or one hydroxypropyl and one hydroxyethyl group, the binder (B) preferably being at least one polymeric resin. Such binders may be obtained, for example, by a method which is described in JP 2011-057944 A.

With further particular preference, the binder (B) is at least one acrylate-based polymeric resin and/or at least one epoxide-based polymeric resin, more particularly at least one cationic epoxide-based and amine-modified resin. The preparation of cationic, amine-modified, epoxide-based resins of this kind is known and is described in, for example, DE 35 18 732, DE 35 18 770, EP 0 004 090, EP 0 012 463, EP 0 961 797 B1, and EP 0 505 445 B1. Cationic epoxide-based amine-modified resins are understood preferably to be reaction products of at least one optionally modified polyepoxide, i.e., of at least one optionally modified compound having two or more epoxide groups, with at least one preferably water-soluble amine, preferably with at least one such primary and/or secondary amine. Particularly preferred polyepoxides are polyglycidyl ethers of polyphenols and are prepared from polyphenols and epihalohydrins. Polyphenols that may be used include, in particular, bisphenol A and/or bisphenol F. Other suitable polyepoxides are polyglycidyl ethers of polyhydric alcohols, such as ethylene glycol, diethylene glycol, triethylene glycol, 1,2-propylene glycol, 1,3-propylene glycol, 1,5-pentanediol, 1,2,6-hexanetriol, glycerol, and 2,2-bis(4-hydroxycyclohexyl)propane. Modified polyepoxides are those polyepoxides in which some of the reactive functional groups have undergone reaction with at least one modifying compound. Examples of such modifying compounds are as follows:

a) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines having secondary amino groups, e.g., N,N'-dialkylalkylenediamines, such as dimethylethylenediamine, N,N'-dialkylpolyoxyalkyleneamines, such as N, N'-dimethyl-polyoxypropylenediamine, cyanoalkylated alkylenediamines, such as bis-N, N'-cyanoethyl-ethylenediamine, cyanoalkylated polyoxyalkyleneamines, such as bis-N,N'-cyanoethylpolyoxypropylenediamine, polyaminoamides, such as Versamides, for example, especially amino-terminated reaction products of diamines (e.g., hexamethylenediamine), polycarboxylic acids, especially dimer fatty acids, and monocarboxylic acids, especially fatty acids, or the reaction product of one mole of diaminohexane with two moles of monoglycidyl ether, or monoglycidyl esters, especially glycidyl esters of α-branched fatty acids, such as of Versatic acid, or c) compounds containing hydroxyl groups, such as neopentyl glycol, bisethoxylated neopentyl glycol, neopentyl glycol hydroxypivalate, dimethylhydantoin-N—N'-diethanol, hexane-1,6-diol, hexane-2,5-diol, 1,4-bis (hydroxymethyl)cyclohexane, 1,1-isopropylidenebis (p-phenoxy)-2-propanol, trimethylolpropane, pentaerythritol, or amino alcohols, such as triethanolamine, methyldiethanolamine, or hydroxyl-containing alkylketimines, such as aminomethylpropane-1,3-diol methyl isobutylketimine or tris(hydroxymethyl) aminomethane cyclohexanone ketimine, and also polyglycol ethers, polyester polyols, polyether polyols, polycaprolactone polyols, polycaprolactam polyols of various functionalities and molecular weights, or d) saturated or unsaturated fatty acid methylesters, which are transesterified in the presence of sodium methoxide with hydroxyl groups of the epoxy resins.

Examples of amines which can be used are mono- and dialkylamines, such as methylamine, ethylamine, propylamine, butylamine, dimethylamine, diethylamine, dipropylamine, methylbutylamine, alkanolamines, such as methylethanolamine or diethanolamine, for example, and dialkylaminoalkylamines, such as dimethylamino-ethylamine, diethylaminopropylamine, or dimethylaminopropylamine, for example. The amines that can be used may also contain other functional groups as well, provided these groups do not disrupt the reaction of the amine with the epoxide group of the optionally modified polyepoxide and also do not lead to gelling of the reaction mixture. Secondary amines are preferably used. The charges which are needed for dilutability with water and for electrical deposition may be generated by protonation with water-soluble acids (e.g., boric acid, formic acid, acetic acid, lactic acid, preferably acetic acid). A further possibility for introducing cationic groups into the optionally modified polyepoxide lies in the reaction of epoxide groups in the polyepoxide with amine salts.

Silane-Containing Crosslinkinq Agent (CA):

As second mandatory component, the inventive aqueous electrocoating material (ECM) comprises at least one crosslinking agent (CA) based on a polyisocyanate parent compound. The isocyanate groups of said parent compound have been reacted with a small amount of a silane compound and afterwards fully blocked with blocking agents. The crosslinking agent (CA) does therefore does not contain any free isocyanate groups before thermal deblocking.

The silane containing crosslinking agent (CA) containing fully blocked NCO groups and at least one silane group is obtained by (i) reacting 0.01 to 5 mol-% of the total amount of free isocyanate groups present in at least one parent structure P with a specific amine-containing silane compound and (ii) subsequent blocking of the remaining NCO groups with at least one blocking agent. Afterwards, the obtained crosslinking agent can (iii) optionally be diluted with at least one solvent.

Step (i)

Reaction of the parent structure P with the silane compound of general formula (I) before addition of at least one further blocking agent BA guarantees a quantitative coupling of the silane compound to the parent structure P. In step (i), the silane compound can be added to the at least one parent structure P or vice versa. Addition of the silane compound or the parent structure P can be done by adding the total amount necessary to achieve the stated chemical conversion of the NCO groups of the parent structure. However, the silane compound or parent structure P can also be added in portions until the total amount necessary to achieve the stated chemical conversion of the NCO groups of the parent structure is achieved.

Preference is given to parent structures P which have an average isocyanate functionality of 2 to 6, preferably of 2 to 5, more preferably of 2 to 4, very preferably of 2.5 to 3.

Polyisocyanates which can be used as parent structure (P) are all known polyisocyanates, not only aliphatic but also aromatic polyisocyanates or mixtures of aromatic and aliphatic polyisocyanates. It is possible here to use not only monomeric polyisocyanates, dimers or trimers of the polyisocyanates, but also oligomeric or polymeric polyisocyanates. Preferred isocyanates are those whose monomeric constituent contains about 3 to about 36, more particularly about 8 to about 15 carbon atoms. Examples of suitable such monomeric polyisocyanates are diisocyanates such as trimethylene diisocyanate, tetramethylene diisocyanate, pentamethylene diisocyanate, hexamethylene diisocyanate, propylene diisocyanate, ethylethylene diisocyanate, methyltrimethylene diisocyanate, trimethylhexamethylene diisocyanate, xylylene diisocyanate, 1,3-cyclopentylene diisocyanate, 1,4-cyclohexylene diisocyanate, 1,2-cyclohexylene diisocyanate, 4,4'-diphenylmethane diisocyanate, 1,5-naphthylene diisocyanate, toluene 2,4-diisocyanate, isophorone diisocyanate, and 4,4'-diisocyanatodicyclohexylmethane. Polyisocyanates of higher isocyanate functionality can also be used, such as tris(4-isocyanatophenyl) methane, 2,4,4'-triisocyanatodiphenylmethane, or bis(2,5-diisocyanato-4-methylphenyl)methane. These polyisocyanates may also be used in the form of the dimer or trimer, or may serve as building blocks for oligomeric or polymeric polyisocyanates. Furthermore, mixtures of polyisocyanates can also be utilized. Preferably, that the at least one parent structure P is selected from the group consisting of (i) aromatic, aliphatic, cycloaliphatic or heterocyclic polyisocyanates; (ii) polyisocyanates derived from said aromatic, aliphatic, cycloaliphatic or heterocyclic polyisocyanates by trimerization, dimerization, urethane formation, biuret formation, uretdione formation and/or allophanate formation; and (iii) mixtures thereof, very preferably aromatic polyisocyanates.

Particularly preferred parent structures P are thus aromatic polyisocyanates. Said aromatic polyisocyanates favorably have the general formula (II)

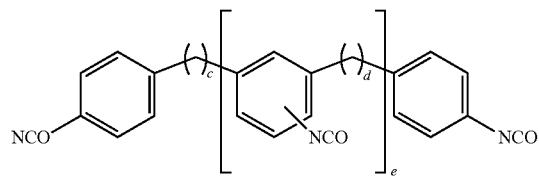
(II)

wherein
c, d are, independently from each other, integral numbers of 1 to 5, preferably 1 to 3, very preferably 1; and
e is 0 to 4, preferably 0 or 1 to 4.

Particularly good results have been achieved if the parent structure P is a mixture of a first polyisocyanate P1 and a second polyisocyanate P2, the first polyisocyanate P1 being different from the second polyisocyanate P2. However, both polyisocyanates P1 and P2 are favorably selected from aromatic polyisocyanates.

In this regard, it is preferred if the mixture of polyisocyanate P1 and P2 contains a monomeric aromatic polyisocyanate and a polymeric aromatic polyisocyanate. Thus, the first polyisocyanate P1 is preferably a polyisocyanate of general formula (II) with c=1 and e=0 and the second polyisocyanate P2 is a polyisocyanate of general formula (II) with c=d=1 and e=1 to 4. Said mixture of monomeric and polymeric 4,4'-diphenylmethane diisocyanate (MDI) is commercially available, for example as Lupranat M20S from BASF.

The silane compound used in step (i) has the general formula (I), wherein X, X', $R^1$ to $R^3$, a, b, m and n have the aforementioned meanings.

X and X' in formula (I) preferably represent, independently from each other, a linear alkylene radical having 1 to 10, preferably 1 to 6, more preferably 2 to 5, very preferably 3, carbon atoms.

$R^2$ in formula (I) preferably represent, independently from each other, a $C_1$-$C_{10}$ alkyl group, preferably a $C_1$-$C_6$ alkyl group, very preferably a $C_1$ alkyl group.

$R^3$ in formula (I) preferably represents a linear $C_1$-$C_{10}$ alkyl group, preferably a linear $C_1$-$C_6$ alkyl group, very preferably a linear $C_4$ alkyl group.

Integers m and n in formula (I) favorably are, independently from each other, 1 or in that m in formula (I) is 1 and n in formula (I) is 0.

Integers a and b in formula (I) favorably are, independently from each other, 0.

Particularly preferred silane containing compounds are thus compounds of general formula (I)

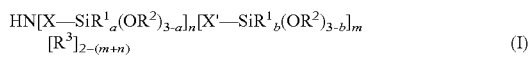
(I)

wherein
X and X' independently from each other, are a linear alkylene radical having 1 to 10, preferably 1 to 6, more preferably 2 to 5, very preferably 3, carbon atoms;
$R^2$ independently from each other, are a $C_1$-$C_{10}$ alkyl group, preferably a $C_1$-$C_6$ alkyl group, very preferably a $C_1$ alkyl group;
$R^3$ is a linear $C_1$-$C_{10}$ alkyl group, preferably a linear $C_1$-$C_6$ alkyl group, very preferably a linear $C_4$ alkyl group;
m and n independently from each other, are 0 to 1 with the proviso, that m+n is not 0; and
a and b independently from each other, are 0.

Preferably 0.5 to 4.5 mol-%, more preferably 0.5 to 4 mol-%, even more preferably 0.5 to 3. mol-%, very preferably 0.7 to 2.5 mol-%, of the total amount of free isocyanate groups present in the at least one parent structure P are reacted in step (i) with the compound of general formula (I). Surprisingly, only the use of small amounts of silane containing compound of general formula (I) leads to improved corrosion resistance and edge coverage while higher amounts result in reduced corrosion resistance and edge protection.

The reaction between the free NCO groups of parent structure P and silane containing compound of general formula (I) is preferably catalyzed by a bismuth catalyst of general formula (III)

(III)

wherein
c is 5 to 15, preferably 7 to 13, very preferably n=7.

The carboxylate radicals are preferably branched, and very preferably have a tertiary or quaternary, preferably quaternary, carbon atom in the alpha-position to the carbon atom of the carboxylate group. Among the bismuth carboxylates, bismuth trineodecanoate in particular has emerged as being especially suitable.

The bismuth carboxylates are preferably used in stabilized form in combination with the parent carboxylic acid of the carboxylate, namely $HOOC(C_cH_{2c+1})$, in which c possesses the definition indicated above. Apart from functioning as stabilizer, the free carboxylic acid may also serve as a catalysis promoter.

After step (i), the free NCO groups of the parent structure P are partially blocked with the silane containing compound of general formula (I), i.e. the parent structure P still contains free NCO groups after step (i).

Step (ii)

In step (ii), the free isocyanate groups remaining after step (i) are fully blocked with at least one blocking agent BA to obtain the crosslinking agent (CA) containing fully blocked isocyanate as well as silane groups. "Fully blocked" here means that the parent structure P no longer possesses any free isocyanate groups and therefore that 100 mol-% of the isocyanate groups originally present in the parent structure P are blocked. Thus, after step (ii), all NCO groups of the parent structure P are blocked with the silane containing compound (I) and at least one further blocking agent BA. The at least one blocking agent BA is preferably removed at higher temperatures, thus generating free isocyanate groups in the crosslinking agent (CA) which can then react—apart from silane groups introduced by the compound of general formula (I)— with the at least one binder (B) present in the aqueous electrocoating material to achieve crosslinking during curing of the applied coating layer.

In order to obtain a fully blocked isocyanate groups after step (ii), it is preferred if 95 to 99.99 mol-%, preferably 95.5 to 99.5 mol-%, more preferably 96 to 99.5 mol-%, even more preferably 97 to 99.5 mol-%, very preferably 97.5 to 99.3 mol-% of the total amount of free isocyanate groups present in the parent structure P are reacted in step (ii) with at least one blocking agent BA. Use of the at least one blocking agent BA in the stated amounts in step (ii) ensures that the free isocyanates remaining after step (i) of are fully blocked by the at least one blocking agent BA.

Examples of Suitable Blocking Agents BA are phenols, such as phenol, cresol, xylenol, nitrophenol, chlorophenol, ethylphenol, tert-butylphenol, hydroxybenzoic acid, esters of this acid or 2,5-di-tert-butyl-4-hydroxytoluene;
lactams, such as ε-caprolactam, δ-valerolactam, γ-butyrolactam or β-propiolactam;
active methylenic compounds, such as diethyl malonate, dimethyl malonate, methyl or ethyl acetoacetate or acetylacetone;
alcohols such as methanol, ethanol, n-propanol, isopropanol, n-butanol, isobutanol, tert-butanol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, di(propylene glycol) methyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyl-dimethanol or acetocyanohydrin;
mercaptans such as butyl mercaptan, hexyl mercaptan, tert-butyl mercaptan, tert-dodecyl mercaptan, 2-mercaptobenzothiazole, thiophenol, methylthiophenol or ethylthiophenol;
acid amides such as acetoanilide, acetoanisidinamide, acrylamide, methacrylamide, acetamide, stearamide or benzamide;
imides such as succinimide, phthalimide or maleimide;
amines such as diphenylamine, phenylnaphthylamine, xylidine, N-phenylxylidine, carbazole, aniline, naphthylamine, butylamine, dibutylamine or butylphenylamine;
imidazoles such as imidazole or 2-ethylimidazole;
ureas such as urea, thiourea, ethyleneurea, ethylenethiourea or 1,3-diphenylurea;
carbamates such as phenyl N-phenylcarbamate or 2-oxazolidone;
imines such as ethylenimine;
oximes such as acetone oxime, formaldoxime, acetaldoxime, acetoxime, methyl ethyl ketoxime, diisobutyl ketoxime, diacetyl monoxime, benzophenone oxime or chlorohexanone oximes;
salts of sulfurous acid such as sodium bisulfite or potassium bisulfite;
hydroxamic esters such as benzyl methacrylohydroxamate (BMH) or allyl methacrylohydroxamate; or
substituted pyrazoles, imidazoles or triazoles; and also
1,2-polyols such as ethylene glycol, propylene glycol, and 1,2-butanediol;
2-hydroxy esters such as 2-hydroxyethyl acrylate, 2-hydroxyethyl methacrylate; and mixtures of these blocking agents BA.

Blocking agents BA preferably used in step (ii) are selected from the group consisting of (i) $C_1$-$C_4$ dialkyl malonates; (ii) ketoximes such as methyl ethyl ketoxime, methyl amyl ketoxime and methyl isobutyl ketoxime; (iii) alcohols such as butylglycol, di(propylene glycol) methyl ether, isopropanol or tert-butanol; (iv) oximes such as formaldoxime, acetaldoxime, butanone oxime, cyclohexanone oxime, acetophenone oxime, benzophenone oxime or diethyl glyoxime; (v) lactams such as ε-caprolactam or δ-valerolactam; (vi) phenols such as phenol or cresol; (vii) N-alkyl amides such as N-methyl acetamide; (viii) imides such as phthalimide; (ix) imidazole; (x) $C_1$-$C_{12}$ alkyl or alkoxyalkyl esters of acetoacetic acid; (xi) pyrazoles and triazoles such as 1,2-pyrazole, 3,5-dimethyl pyrazole or 1,2,4-triazole; (xii) secondary amines such as diisopropyl amine; and (xiii) mixtures thereof, very preferably alcohols.

Particularly preferred blocking agents BA are primary and/or secondary alcohols. Therefore, a favorable embodiment of the first subject-matter of the present invention is characterized in that the at least one blocking agent BA is selected from primary and/or secondary alcohols of general formula (IV)

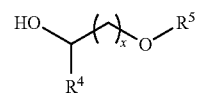

(IV)

wherein
x is 1 to 5, preferably 1,
$R^4$ represents hydrogen or a $C_1$-$C_4$ alkyl residue, preferably hydrogen or a $C_1$ alkyl residue;
$R^5$ represents a linear or branched $C_1$-$C_{10}$ alkyl residue or a residue *—$(CH_2)_y$—$CH(CH_3)$—O—$R^6$ attached via * to the oxygen atom, preferably a linear $C_4$ alkyl residue or a residue*—$(CH_2)_y$—$CH(CH_3)$—O—$R^6$ attached via * to the oxygen atom;
$R^6$ represents a $C_1$-$C_4$ alkyl residue, preferably a $C_1$ alkyl residue; and
y is 1 to 5, preferably 1.

According to a preferred embodiment of step (ii), a first blocking agent BA1 and a second blocking agent BA2 are used, the blocking agent BA1 being different from the blocking agent BA2.

In this respect, it is favorable if the first blocking agent BA1 is a compound of general formula (IV) with x=1, $R^4$=H and $R^5$=$C_4$ alkyl and the second blocking agent BA2 is a compound of general formula (IV) with x=1, $R^4$=$CH_3$, $R^5$=*—$(CH_2)_y$—$CH(CH_3)$—O—$R^6$, $R^6$=$CH_3$ and y=1. Use of a combination of different blocking agents BA1 and BA2 in combination with the silane containing compound of general formula (I) results in a high corrosion resistance and excellent edge protection of cured electrocoats prepared from the inventive aqueous electrocoating material (ECM).

In case two different blocking agents BA1 and BA2 are used in step (ii), it is preferred if 50 to 75 mol-%, preferably 60 to 70 mol-%, very preferably 66 to 69 mol-%, of the total amount of free isocyanate groups present in the at least one parent structure P are reacted in step (ii) with the first blocking agent BA1.

Moreover, it is preferred if 20 to 35 mol-%, preferably 25 to 35 mol-%, very preferably 28 to 30 mol-%, of the total amount of free isocyanate groups present in the at least one parent structure P are reacted in step (ii) with the second blocking agent BA2.

Step (iii)

Optional step (iii) of the inventive method comprises the addition of at least one solvent to the crosslinking agent (CA) obtained after step (ii).

The fully blocked crosslinking agent (CA) obtained after step (ii) can optionally be diluted with at least one solvent in order to decrease the viscosity of the obtained crosslinking agent for ease of handling and preparation of the inventive aqueous electrocoating material (ECM).

In principle, all solvents that are compatible with aqueous electrocoating materials can be used in step (iii) of the inventive process. Thus, the solvent should preferably be miscible with water or soluble in water. Particularly preferred solvents used in step (iii) are selected from the group consisting of secondary alcohols and/or ethers, preferably butoxy propanol, phenoxy propanol and bis(2-(2-butoxyethoxy)ethoxy)methane.

The amount of solvent added in step (iii) is depending on the desired viscosity and solids content of the diluted crosslinking agent (CA). Generally, said solvent is added in such amounts that a solids content of 80 to 90% is obtained (the solid content is obtained according to the method described in the examples).

The crosslinking agent (CA) containing fully blocked isocyanate and silane groups preferably has a weight average molecular weight $M_w$ of 1,000 to 2,500 g/mol, more preferably 1,200 to 2,000 g/mol, very preferably 1,300 to 1,500 g/mol, as determined by gel permeation chromatography according to ISO 13885-1:2008-08.

The number average molecular weight $M_n$ of the crosslinking agent (CA) is preferably 900 to 1,500 g/mol, more preferably 950 to 1,100 g/mol, very preferably 970 to 1,050 g/mol, as determined by gel permeation chromatography according to ISO 13885-1:2008-08.

The crosslinking agent (CA) preferably has a viscosity (60% by weight of a solution in butoxy propanol) of 200 to 350 mPa*s, very preferably of 215 to 300 mPa*s, as determined with a Brookfield CAP2000+ viscosimeter, cone plate configuration, cone CAP 03, at 23° C. and a shear rate of 5,000 s$^{-1}$.

Bismuth (c):

The aqueous electrocoating material (ECM) further comprises at least 100 ppm of bismuth. Under the term "bismuth", the present invention preferably understands cathodic bismuth atoms of various valences. The bismuth here may be in trivalent form (Bi(III)), but alternatively or additionally may also be in other oxidation states. The amount of bismuth is calculated in each case as bismuth metal.

The total amount of bismuth in the aqueous electrocoating material (ECM), based on the total weight of the aqueous electrocoating material (ECM), is preferably in a range from 130 ppm to 20 000 ppm, more preferably in a range from 150 ppm to 15 000 ppm, very preferably in a range from 200 ppm to 10 000 ppm, especially preferably in a range from 500 ppm to 10 000 ppm or in a range from 500 to 20 000 ppm or in a range from 1000 ppm to 10 000 ppm or in a range from 1000 ppm to 5000 ppm or in a range from 500 ppm to 3000 ppm. The amount of bismuth, calculated as metal, can be determined by the method described in the working examples (ICP-OES). This is, of course, not necessary if the amounts of bismuth-containing constituents used are known directly and an arithmetic determination is possible.

In one particular embodiment of the present invention, the aqueous electrocoating material (ECM) comprises at least 130 ppm of bismuth, based on the total weight of the electrocoating material, including
  at least 30 ppm of dissolved bismuth and
  at least 100 ppm of undissolved bismuth.

The term "dissolved bismuth" is preferably understood such that bismuth is present in dissolved form in the electrocoating material (ECM) at a temperature of 20° C. of said material. Before it is introduced into the electrocoating material (ECM), therefore, the bismuth compound is preferably part of a compound of at least limited water-solubility, more particularly of a bismuth salt of at least limited water-solubility. By introducing a bismuth salt of at least limited water-solubility into the electrocoating material (ECM), at least a part of the bismuth salt is then dissolved to provide the content of dissolved bismuth stated above. The amount of dissolved bismuth, calculated as metal, can be determined by the method described in the working examples (ICP-OES). Dissolved bismuth is preferably introduced with the additional use of an at least bidentate complexing agent suitable for the complexing of bismuth. Such a complexing agent will lead in general to a higher fraction of dissolved bismuth than that dictated by the water-solubility of the particular bismuth compound. Alternatively and/or additionally, for example, dissolved bismuth may also be present in the form of hydrated bismuth. Trivalent bismuth is preferably present at least partly as dissolved bismuth.

Dissolved bismuth is preferably obtainable from at least one bismuth compound selected from the group consisting of oxides, basic oxides, hydroxides, carbonates, nitrates, basic nitrates, salicylates and basic salicylates of bismuth, and also mixtures thereof. In this case at least one such bismuth compound is reacted preferably in water in the presence of at least one complexing agent to obtain dissolved bismuth in the form of a complex between the cationic bismuth ions and the complexing agent.

The complexing agent is preferably at least bidentate. A skilled person knows of the term "denticity". The term refers to the number of possible bonds which can be formed by a molecule of the complexing agent to the atom that is to be complexed, such as to the bismuth atom and/or bismuth ion that is to be complexed. Preferably, the complexing agent is bidentate, tridentate or tetradentate, more particularly bidentate.

Suitable complexing agents are selected from the group consisting of nitrogen-free, preferably at least singly hydroxyl-substituted organic monocarboxylic acids, nitrogen-free, optionally at least singly hydroxyl-substituted organic polycarboxylic acids, optionally at least singly hydroxyl-substituted aminopolycarboxylic acids, optionally at least singly hydroxyl-substituted aminomonocarboxylic acids, and sulfonic acids, and also, in each case, their anions, and, moreover, of preferably optionally at least singly hydroxyl-substituted monoamines and optionally at least singly hydroxyl-substituted polyamines, and of chemical compounds which comprise at least two O donor atoms and do not fall within the compounds identified within this recitation, such as, for example, 8-hydroxyquinoline and acetylacetone. More preferably, the complexing agent is selected from the group consisting of ethylenediaminetetraacetic acid, lactic acid, N,N,N',N'-tetrakis-2-hydroxypropylethylenediamine, N,N'-bis(2-hydroxyethyl)glycine, and N,N,N',N'-tetrakis-2-hydroxyethylethylenediamine, very preferably N,N'-bis(2-hydroxyethyl)glycine (bicine).

If ethylenediaminetetraacetic acid and/or anions thereof is used as complexing agent, it is present preferably in a fraction in a range of <100 mol %, more preferably in a range from 20 to 60 mol %, based in each case on the total amount of bismuth present in the aqueous electrocoating material (ECM). If N,N'-bis(2-hydroxyethyl)glycine is used as complexing agent, it is present preferably in a fraction in a range of <900 mol %, more preferably in a range from 100 to 700 mol %, based in each case on the total amount of bismuth present in the aqueous electrocoating material (ECM). If N,N,N',N'-tetrakis-2-hydroxyethylethylenediamine is used as complexing agent, it is present preferably in a fraction in a range from 100 to 600 mol %, based in each case on the total amount of bismuth present in the aqueous electrocoating material (ECM). If N,N,N',N'-tetrakis-2-hydroxypropylethylenediamine is used as complexing agent, it is preferably in a fraction in a range from 50 to 300 mol %, based in each case on the total amount of bismuth present in the aqueous electrocoating material (ECM).

The total amount of dissolved bismuth is preferably at least 50 ppm, more preferably at least 75 ppm, very preferably at least 100 ppm or at least 200 ppm, more particularly at least 250 ppm, based in each case on the total weight of the aqueous electrocoating material (ECM). The amount of dissolved bismuth is calculated in each case as bismuth metal and may be obtained in turn via the ICP-OES method (see Examples section).

In contrast, the term "undissolved bismuth" refers to bismuth being present in an undissolved form in the aqueous electrocoating material at a temperature of 20° C. Before it is introduced into the electrocoating material therefore, undissolved bismuth is preferably part of a compound with only limited water-solubility, more particularly of a bismuth salt with only limited water-solubility. Undissolved bismuth is preferably introduced in the form of oxides, basic oxides, hydroxides, carbonates, basic nitrates (subnitrates), salicylates and basic salicylates (subsalicylates) of bismuth, and also mixtures thereof, more preferably in the form of bismuth subnitrate.

The aqueous electrocoating material preferably comprises at least 150 ppm, more preferably at least 200 ppm, very preferably at least 250 ppm or at least 300 ppm, more particularly at least 500 ppm, of undissolved bismuth, based in each case on the total weight of the aqueous electrocoating material. The amount of undissolved bismuth is calculated in each case as bismuth metal and can in turn be computed using the ICP-OES method (see Examples section).

The fraction of undissolved bismuth within the total amount of the bismuth present in the aqueous electrocoating material is preferably at least 10 mol %, more preferably at least 20 mol % or at least 30 mol %, very preferably at least 40 mol % or at least 50 mol % or at least 60 mol % or at least 70 mol %. The fraction of undissolved bismuth within the total amount of bismuth contained in the aqueous electrocoating material here is preferably in each case at most 98 mol %, more preferably at most 97 mol % or at most 96 mol %, very preferably at most 95 mol %. The fraction of undissolved bismuth in mol % within the total amount of the bismuth in the aqueous electrocoating materials is preferably greater than the fraction of dissolved bismuth in mol %.

Very preferably the inventive aqueous electrocoating material comprises a total amount of at least 500 ppm of bismuth, based on the total weight of the electrocoating material, including
    at least 200 ppm of dissolved bismuth and
    at least 300 ppm of undissolved bismuth.

It follows from the above that the dissolved and undissolved bismuth, optionally with use of a complexing agent, may result from a single bismuth compound. By adapting the proportions of the complexing agent and the bismuth compound and/or by suitably choosing a particular amount of a bismuth compound having a defined, limited water-solubility, it is possible to obtain the target amounts of dissolved and undissolved bismuth previously stated. Also of advantage in this context is that the bismuth compound and optionally the complexing agent can also be added to the electrocoating material directly and without a separate mixing step. In this way, the dissolved bismuth can be introduced very efficiently into the electrocoating material. This procedure, i.e., the direct addition of such a bismuth compound, meaning in particular a not fully water-soluble bismuth compound or a bismuth compound only sparingly soluble in water, and also of a complexing agent, to the electrocoating material is therefore preferred.

The dissolved and/or undissolved bismuth may serve as a crosslinking catalyst. Crosslinking catalysts in the context of the present invention are catalysts which catalyze the reaction of corresponding reactive functional groups of the binder (B) with complementary reactive functional groups of the crosslinking agent (CA). A preferred combination of functional groups, accordingly, consists of isocyanate-reactive groups of the binder (B), more preferably hydroxyl groups, and isocyanate groups of the crosslinking agent (CA), preferably after unblocking the blocked isocyanate groups of said crosslinking agent. This renders the use of a further separate crosslinking catalysts superfluous.

Dissolved Lithium (d):

The inventive aqueous electrocoating material comprises at least 300 ppm of dissolved lithium. The term "lithium" preferably refers to cationic lithium atoms. The lithium in this case is present as Li(I), in other words with the +1 valence. The amounts of lithium is calculated as metal and the fraction or the amount of lithium may be obtained in turn via the ICP-OES method (see Examples section).

The term "dissolved lithium" is preferably understood such that lithium is present in dissolved form at a temperature of the aqueous electrocoating material of 20° C. Before it is introduced into the electrocoating material, therefore, lithium is preferably part of a compound of limited water-solubility, more particularly of a lithium salt of limited water-solubility. The lithium is preferably obtainable from at least one lithium salt, more preferably a lithium salt selected from the group consisting of lithium acetate, lithium carbonate, lithium nitrate, lithium hydroxide, lithium phosphate, lithium formate, lithium salicylate, lithium sulfate, lithium molybdate, lithium tetraborate.

The aqueous electrocoating material (ECM) preferably comprises not more than 250 ppm, more preferably not more than 200 ppm, very preferably not more than 150 ppm or not more than 100 ppm, more particularly not more than 70 ppm or 50 ppm or not more than 40 ppm or not more than 30 ppm, of dissolved lithium, based in each case on the total weight of the electrocoating material. Preferred ranges among these are 2.5 to 250 ppm, 5 to 200 ppm, 7.5 to 150 ppm, 10 to 100 ppm, 12.5 to 70 ppm, 12.5 to 50 ppm or 12.5 to 40 ppm, or 12.5 to 30 ppm, based in each case on the total weight of the electrocoating material.

It has emerged that a certain fraction of dissolved lithium is essential to obtain an improved corrosion prevention.

Exceeding the values specified above results in a poor quality (holes, specks, poor adhesion) of the produced coating layer or even renders the deposition impossible.

Of course, the electrocoating material may also comprise undissolved lithium. This is the case, for example, when lithium salts which are not fully water-soluble in the employed amounts are used and are therefore present partly in undissolved form. The term "undissolved lithium" is again subject relatively to the principles described above for undissolved bismuth. Accordingly, it means preferably that this lithium is present in undissolved form at a temperature of the aqueous electrocoating material of 20° C. The fraction of undissolved lithium can in turn be calculated using the ICP-OES method (see Examples section).

Copper:

In one preferred embodiment of the present invention, the electrocoating material (ECM) further comprises copper, preferably in dissolved form. The conditions and features in relation to the copper present in "dissolved form" or "undissolved form" and the amounts thereof (calculated as metal) correspond in principle to the circumstances described above for bismuth and lithium. At this point too, moreover, in analogy to bismuth and lithium, the term "copper" refers preferably to cationic copper atoms. The copper here is present preferably as Cu(II), in other words with the +2 valence.

Where copper is included, it is preferred for the fraction of dissolved copper to be not lower than 5 ppm, preferably not lower than 10 ppm, especially preferably not lower than 15 ppm or else 20 ppm (based in each case on the total amount of the electrocoating material). Further preferred are amounts of dissolved copper of 5 to 1000 ppm, preferably 10 to 750 ppm, more preferably 15 to 500 ppm or else 20 to 250 ppm. The fraction or the amount of dissolved copper may in turn be obtained via the ICP-OES method (see Examples section).

The dissolved copper is preferably obtainable from at least one copper salt, more preferably a copper salt selected from the group consisting of copper nitrate, copper sulfate, and copper acetate.

By using dissolved copper, preferably in the previously stated amounts, a further improvement in the corrosion inhibition properties, particularly in respect of substrates which are not only aluminum—but also steel-based (i.e. substrates having different regions in terms of their metal type) can be achieved. Indeed, the fact that such electrocoating materials are able to offer outstanding corrosion protection in relation to both types of metal is particularly advantageous in view of the increasing importance of such substrates (lightweight construction).

As already indicated above, the electrocoating material may also further comprise undissolved copper. This is the case, for example, when copper salts which are not fully water-soluble in the used amounts are employed. This fraction as well may in turn be determined via the ICP-OES method.

Additive (AD):

The electrocoat materials of the invention may further comprise at least one typical and known additive (AD), selected from the group consisting of catalysts, pigments, anticrater additives, polyvinyl alcohols, thermally curable reactive diluents, molecularly dispersedly soluble dyes, light stabilizers, such as UV absorbers and reversible free-radical scavengers (HALS), antioxidants, low-boiling and high-boiling ("long") organic solvents, devolatilizers, wetting agents, emulsifiers, slip additives, polymerization inhibitors, thermolabile free-radical initiators, adhesion promoters, flow control agents, film-forming assistants, flame retardants, corrosion inhibitors, free-flow aids, waxes, siccatives, biocides, matting agents, inorganic and organic salts and mixtures thereof. The additive content may vary very widely according to intended use. The amount, based on the total weight of the aqueous electrocoating material (ECM), is preferably 0.1 to 20 wt. %, more preferably 0.1 to 15 wt. %, very preferably 0.1 to 10 wt. %, especially preferably 0.1 to 5 wt. %, and more particularly 0.1 to 2.5 wt. %.

Pigments are preferably used as additives. The pigments are preferably selected from the group consisting of customary and known color pigments, effect pigments, electrically conductive pigments, magnetically shielding pigments, fluorescent pigments, extender pigments, and anticorrosion pigments, organic and inorganic. The pigment content of the aqueous electrocoating material (ECM) may vary according to intended use and according to the nature of the pigments. The amount, based in each case on the total weight of the aqueous electrocoating material (ECM), is preferably in the range from 0.1 to 30 wt. % or in the range from 0.5 to 20 wt. %, more preferably in the range from 1.0 to 15 wt. %, very preferably in the range from 1.5 to 10 wt. %, and more particularly in the range from 2 to 5 wt. %, or in the range from 2 to 4 wt. %, or in the range from 2 to 3.5 wt. %.

The pigments are preferably introduced into the aqueous electrocoating material (ECM) as a pigment paste or pigment preparation. Said pigment paste is preferably prepared by grinding a resin (so called grinding resin) with the respective pigment and a solvent, preferably water. Suitable grinding resins are, for example, described in EP 505 445 B1.

The aqueous electrocoating materials (ECM) of the invention preferably have a solids content of 5% to 50%, preferably 5% to 35% by weight. The solids here is the fraction of the electrocoating material that builds the electrocoat being produced from said material. Methods for determining the solids content are known to the skilled person. The solids content is determined preferably according to DIN EN ISO 3251 (date: Jun. 1, 2008).

The electrocoating material of the invention preferably has a pH in a range from 4.0 to 6.5. The electrocoating material in accordance with the invention more preferably has a pH in the range from 4.2 to 6.5, more particularly in the range from 4.4 to 6.5 or in the range from 4.6 to 6.5, especially preferably in the range from 4.8 to 6.4, most preferably in the range from 5.0 to 6.2 or 5.2 to 6.0 or 5.5 to 6.0. Methods for adjusting pH levels in aqueous compositions are known to the skilled person. The desired pH is preferably set by addition of at least one acid, more preferably at least one inorganic and/or at least one organic acid. Examples of suitable inorganic acids are hydrochloric acid, sulfuric acid, phosphoric acid and/or nitric acid. An example of a suitable organic acid is propionic acid, lactic acid, acetic acid and/or formic acid. Alternatively or additionally and also preferably it is possible as well to use the at least one bidentate complexing agent for adjusting the pH level, provided said agent is suitable for the purpose, i.e., has for example at least one deprotonable functional group such as a carboxyl group and/or a phenolic OH group, for example.

The aqueous electrocoating materials (ECM) of the invention can in principle be carried out according to the production methods commonplace and known in particular for cathodic electrocoat materials, comprising the mixing and dispersing of the included components in a sequence typical for this purpose.

Preferably, the aqueous electrocoating material (ECM) is prepared by mixing a pigment paste with an aqueous dispersion of the binder (B) and the crosslinking agent (CA). The pigment paste is preferably prepared by grinding the respective pigment with a grind resin and at least one water-insoluble bismuth compound as previously described. The water-insoluble bismuth compound is afterwards transferred at least partially into the dissolved form by addition of at least one bidentate complexing agent, preferably in the presence of a lithium compound, optionally a copper compound and optionally further additives (AD). The resulting dispersion is homogenized, for a duration of preferably at least 2 or at least 4 or at least 6 or at least 8 or at least 10 or at least 12 or at least 14 or at least 16 or at least 18 or at least 20 or at least 22 or at least 24 hours at a temperature of 18 to 23° C. Mixing and homogenization can be performed by using customary and known mixing techniques and apparatus such as stirred tanks, stirred mills, extruders, kneading apparatus, Ultraturrax, inline dissolvers, static mixers, micromixers, toothed-gear dispersers, pressure relief nozzles and/or microfluidizers.

The lithium and optionally copper, especially the dissolved lithium and optionally dissolved copper, may be introduced as part of the production operation by means, for example, of the partial or complete dissolution of a lithium compound and/or a copper compound, more particularly a salt. It is equally possible for components lithium and optionally copper, as water-soluble compound, to be merely dissolved in water and then introduced as an aqueous solution into the coating composition.

Inventive Method for at Least Partially Coating an Electrically Conductive Substrate:

The inventive method comprises at least partially contacting an electrically conductive substrate connected to a current circuit with the inventive aqueous coating material in a two-step deposition process.

All preferred embodiments described hereinabove in connection with the aqueous electrocoating material (ECM) of the invention are also preferred embodiments of the aqueous electrocoating material (ECM) used in accordance with the invention, in relation to the method described here for at least partially coating an electrically conductive substrate.

Electrically Conductive Substrate:

Suitable electrically conductive substrates used in accordance with the invention are all electrically conductive substrates known to the skilled person that are customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminumized steel, aluminum, and magnesium; particularly suitable are galvanized steel and aluminum. Suitable as substrates, moreover, are hot-rolled steel, high-strength steel, Zn/Mg alloys, and Zn/Ni alloys. Particularly suitable substrates are parts of bodies or complete bodies of automobiles for production. The method of the invention can also be used for coil coating. Before the electrically conductive substrate in question is used, the substrate is preferably cleaned and/or degreased.

The electrically conductive substrate used in accordance with the invention may be a substrate pretreated with at least one metal phosphate or may be a chromated substrate. A specific advantage of the present invention, however, is that it is possible to omit such pretreatment. Therefore, the electrically conductive substrate used in accordance with the invention is preferably not a phosphatized or chromated substrate.

Prior to being coated with the aqueous electrocoating material (ECM) of the invention, the electrically conductive substrate used in accordance with the invention may be pretreated with an aqueous pretreatment composition which comprises at least one water-soluble compound comprising at least one Ti atom and/or at least one Zr atom and which comprises at least one water-soluble compound as a source of fluoride ions, comprising at least one fluorine atom, or with an aqueous pretreatment composition which comprises a water-soluble compound obtainable by reaction of at least one water-soluble compound comprising at least one Ti atom and/or at least one Zr atom with at least one water-soluble compound as a source of fluoride ions, comprising at least one fluorine atom. The preparation of such pretreatment compositions and their use in the pretreatment of electrically conductive substrates are known from WO 2009/115504 A1, for example. In one preferred embodiment, however, the electrically conductive substrate used in accordance with the invention is a substrate which has not been pretreated with any such pretreatment composition.

It is an advantage of the electrocoating material of the invention that not only a generally good corrosion prevention is effect achieved but also, moreover, it is possible to set and achieve an optimized adaptation of the effect to different substrates. In this sense it is of particular advantage that substrates which have regions differing in their metal type, in particular regions which both are aluminum-based and steel-based, can be coated with one and the same electrocoating material to obtain an outstanding corrosion prevention effect on all substrate regions. Preferred substrates, accordingly, are those which have regions differing in their metal type, in particular both aluminum-based and steel-based regions.

Step (1)

The electrically conductive substrate is at least partially contacted with the aqueous electrocoating material (ECM) of the invention while the conductive substrate is connected as cathode in step (1).

"Contacting" in the sense of the present invention refers preferably to the immersing of the substrate into the aqueous electrocoating material (ECM) as well as the spraying or roll application of the substrate with the aqueous electrocoating material (ECM). More particularly, the term "contacting" in the sense of the present invention refers to immersing of the substrate into the aqueous electrocoating material (ECM).

The method of the invention is preferably a method for at least partly coating an electrically conductive substrate used in and/or for automobile construction. The method may take place continuously in the form of a strip coating operation, such as in the coil coating process, for example, or discontinuously.

After step (1) of the method of the invention, the substrate is at least partly coated with the aqueous electrocoating material (ECM) of the invention by cataphoretic deposition of this coating composition on the substrate surface. Step (1) is accomplished by applying an electrical voltage between the substrate and at least one counterelectrode. Step (1) of the method of the invention is carried out preferably in a dip-coating bath. The counterelectrode may in this case be located in the dip-coating bath. Alternatively or additionally, the counterelectrode may also be present separately from the dip-coating bath, for example via an anion exchange membrane which is permeable to anions. In this case, anions formed during dip coating are transported from the coating material through the membrane into the anolyte, allowing the pH in the dip-coating bath to be regulated or kept constant. The counterelectrode is preferably separate from the dip-coating bath.

In step (1) of the method of the invention, preferably, there is full coating of the substrate with the aqueous electrocoating material (ECM) of the invention, by complete cataphoretic deposition on the entire substrate surface.

The aqueous electrocoating material (ECM) of the invention is preferably contacted with an electrically conducting anode and with the electrically conductive substrate connected as cathode. Alternatively, the aqueous electrocoating material (ECM) does not have to be brought directly into contact with an electrically conducting anode, if the anode, for example, is present separately from the dip-coating bath, as for example via an anion exchange membrane which is permeable to anions. The passage of electrical current between anode and cathode is accompanied by deposition of a firmly adhering paint film on the cathode, i.e., on the substrate.

Step (1) of the method of the invention is carried out preferably at a dip bath temperature in a range from 20 to 45° C., more preferably in a range from 22 to 42° C., very preferably in a range from 24 to 41° C., especially preferably in a range from 26 to 40° C., with more particular preference in a range from 27 to 39° C., such as in a range from 28 to 38° C., for example. In another preferred embodiment of the method of the invention, step (1) is carried out at a dip bath temperature of not more than 40° C., more preferably not more than 38° C., very preferably not more than 35° C., especially preferably not more than 34° C. or not more than 33° C. or not more than 32° C. or not more than 31° C. or not more than 30° C. or not more than 29° C. or not more than 28° C.

In step (1) of the method of the invention, the aqueous electrocoating material (ECM) of the invention is preferably applied such that the resulting electrocoat film has a dry film thickness in the range from 5 to 40 μm, more preferably from 10 to 30 μm, especially preferably from 20 to 25 μm.

Step (1) of the method of the invention is carried out in at least two successive steps (1a) and (1b) later described in detail. Steps (1a) and (1b) within step (1) of the method of the invention are carried out preferably within a dip-coating bath comprising the electrocoating material (ECM).

Step (1a)

During the implementation of step (1a), a corresponding layer enriched in bismuth and also, preferably, in copper is formed and may be termed a preliminary deposition layer on the electrically conductive substrate, this being detectable and quantifiable by X-ray fluorescence analysis, for example. Without wishing to be bound to any particular theory, the assumption is that lithium too is part of this layer. Bismuth, lithium and preferably copper are here preferably in the form of metallic bismuth(0), lithium (0), and preferably copper (0), but alternatively or additionally may also be present in their correspondingly known oxidation states. This preliminary deposition layer is, in particular, largely free of binder (B), crosslinking agent (CA) and/or dissolved bismuth and/or pigment present in the coating composition.

Step (1a) is carried out preferably with an applied voltage in a range from 1 to 45 V or in a range from 1 to 40 V or in a range from 1 to 35 V or in a range from 1 to 30 V or in a range from 1 to 25 V or in a range from 1 to 20 V or in a range from 1 to 15 V or in a range from 1 to 10 V or in a range from 1 to 5 V. In another preferred embodiment, step (1a) is carried out with an applied voltage in a range from 2 to 45 V or in a range from 2 to 40 V or in a range from 2 to 35 V or in a range from 2 to 30 V or in a range from 3 to 25 V or in a range from 3 to 20 V or in a range from 3 to 15 V or in a range from 3 to 10 V or in a range from 3 to 6 V.

The voltage applied in step (1a) is applied over a duration of at least 5 seconds, preferably of at least 10 or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of step (1a).

In one preferred embodiment, the voltage applied in step (1a) is applied over a duration in a range from at least 5 to 500 seconds or from 5 to 500 seconds or from 10 to 500 seconds or from 10 to 300 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

A voltage in a range from 1 to 50 V which is applied during the implementation of step (1a) over a duration of at least 10 seconds may be set galvanostatically (constantly regulated current). Alternatively, this setting may also be accomplished potentiostatically (constantly regulated voltage), however, with step (1a) being carried out at a deposition current or in a deposition current range that corresponds to a corresponding voltage in a range from 1 to 50 V. A deposition current of this kind is preferably in a range from 20 to 400 mA, more preferably in a range from 30 to 300 mA or in a range from 40 to 250 mA or in a range from 50 to 220 mA, more particularly in a range from 55 to 200 mA. Such deposition currents within step (1a) are used preferably when employing substrates which have a surface area in the range from 300 to 500 cm$^2$, more particularly from 350 to 450 cm$^2$ or 395 to 405 cm$^2$.

The deposition current density in step (1a) is preferably at least 1 A/m$^2$, more preferably at least 2 A/m$^2$, and more particularly at least 3 A/m$^2$, but preferably in each case not more than 20 A/m$^2$, more preferably in each case not more than 10 A/m$^2$.

The deposition current density or the deposition current in step (1a) here is applied preferably over a duration of at least 5 or at least 10 seconds, preferably at least 15 or at least 20 or at least 25 or at least 30 or at least 40 or at least 50 seconds, more preferably at least 60 or at least 70 or at least 80 or at least 90 or at least 100 seconds, very preferably at least 110 or at least 120 seconds. The duration here is preferably not more than 300 seconds, more preferably not more than 250 seconds, and more particularly not more than 150 seconds. In another preferred embodiment, the deposition current density or deposition current applied in step (1a) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage or the deposition current or the deposition current density may be kept constant here during the stated duration. Alternatively, however, the voltage or the deposition current or the deposition current density may also adopt different values during the deposition duration within step (1a), within the stated minimum and maximum values in the range from 1 to 50 V—for example, it may swing back and forth or rise in ramp or step form from the minimum to the maximum deposition voltage.

The setting of the voltage or of the deposition current or deposition current density during the implementation of step (1a) may take place "suddenly", in other words, for example, by appropriately switching over to a rectifier, this requiring a certain technically related minimum period of time in order to attain the target voltage. Alternatively, setting may take place in the form of a ramp, in other words at least approximately continuously and preferably linearly over a selectable period, as for example a period of up to 10, 20, 30, 40, 50, 60, 120, or 300 seconds. Preferred is a ramp of up to 120 seconds, more preferably of up to 60 seconds. A step like voltage increase is also possible here, in which case preferably a certain hold time at the voltage is observed for each of these voltage stages, of 1, 5, 10, or 20 seconds, for example. Also possible is a combination of ramps and steps.

The setting of the voltage or of the deposition current or deposition current density in step (1a) may also be regulated in the form of pulses, with times without current or with a voltage below the minimum level between two pulses. The pulse duration may be situated, for example, in the range from 0.1 to 10 seconds. The "period" for the deposition is then considered, preferably, to be the sum total of the durations for which the deposition voltage lies within the aforementioned maximum and minimum values when implementing step (1a). Ramps and pulses may also be combined with one another.

During the implementation of step (1a), the complexing agent is preferably liberated again at least partly, more particularly completely, since the dissolved bismuth complexed by the complexing agent is deposited. In view of the preferred presence of undissolved bismuth in the electrocoating material (ECM), the liberated complexing agent may be utilized in order to convert undissolved bismuth at least partly into dissolved bismuth—thus, the complexing agent may be used for the continual generation of dissolved bismuth, in order to ensure the presence of an appropriate reservoir of dissolved bismuth within the electrocoating material (ECM).

Step (1b)

During the implementation of step (1 b), the actual dip coating is formed on the preliminary deposition layer obtained after step (1a), by deposition of the dip components, more particularly binder (B), crosslinking agent (CA) and preferably pigment. This coating as well comprises bismuth, for example, which may be present in the known oxidation states. This bismuth may act as catalyst in a downstream curing step or crosslinking step of the method of the invention.

Step (1b) is preferably carried out at an applied voltage in a range from 55 to 400 V or in a range from 75 to 400 V or in a range from 95 to 400 V or in a range from 115 to 390 V or in a range from 135 to 370 V or in a range from 155 to 350 V or in a range from 175 to 330 V or in a range from 195 to 310 V or in a range from 215 to 290 V.

In step (1b), preferably, in a time interval in the range from 0 to 300 seconds after the end of the implementation of stage (1a), a voltage in the range from 50 to 400 V is applied, preferably relative to an inert counterelectrode, but with the proviso that this voltage applied in step (1b) is greater by at least 10 V than the voltage applied before in step (1a). Within the implementation of step (1 b), this voltage is preferably maintained for a time in the range from 10 to 300 seconds, preferably in the range from 30 to 240 seconds, at not less than a value within the stated voltage range from 50 to 400 V, subject to the proviso stated above.

The voltage applied in step (1b) is preferably applied over a duration of at least 10 seconds or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of step (1b).

In one preferred embodiment, the voltage applied in step (1b) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage increase from step (1a) to step (1b) may take place "suddenly", in other words, for example, by corresponding switching over on a rectifier, this requiring a certain technically related minimum time to attain the target voltage. The voltage increase may alternatively take place in the form of a ramp, in other words at least approximately continuously over a selectable period, as for example of up to 10, 20, 30, 40, 50, 60, 120, or 300 seconds. A preferred ramp is of up to 120 seconds, more preferably of up to 60 seconds. Also possible is a voltage increase in steps, in which case a certain holding time at the voltage is preferably observed for each of these voltage steps, of 1, 5, 10, or 20 seconds, for example. Also possible is a combination of ramps and steps.

The indication of a period such as, for example, of a period in the range from 10 to 300 seconds for the application of the voltage in step (1b) in a range from 50 to 400 V may mean that this voltage is held constant during the stated period. Alternatively, however, the voltage may also adopt different values during the deposition time within step (1b), within the stated minimum and maximum values in the range from 50 to 400 V—for example, it may swing back and forth or increase in a ramp or in steps from the minimum to the maximum deposition voltage.

The voltage, i.e., deposition voltage, in step (1b) may also be regulated in the form of pulses, with times without current and/or with a deposition voltage below the minimum level between two pulses. The pulse duration may be situated, for example, in the range from 0.1 to 10 seconds. The "period" for the deposition is then considered preferably to be the sum of the durations in which the deposition voltage lies within the stated maximum and minimum levels in the implementation of step (1b). Ramps and pulses may also be combined with one another.

Further Optional Method Steps:

The method of the invention optionally further comprises a step (2), preferably following step (1), in which the substrate obtained after step (1) is contacted with an aqueous sol-gel composition prior to curing of the deposited electrocoating material (ECM).

An aqueous "sol-gel composition" in the sense of the present invention is preferably an aqueous composition prepared by reacting at least one starting compound with water, with hydrolysis and condensation, this starting compound having at least one metal atom and/or semimetal atom such as M¹ and/or M², for example, and having at least two hydrolyzable groups such as, for example, two hydrolyzable groups X¹, and further, optionally, having at least one nonhydrolyzable organic radical such as R¹, for example. The at least two hydrolyzable groups here are preferably each bonded directly to the at least one metal atom and/or at least one semimetal atom present in the at least one starting compound, in each case by means of a single bond. Because of the presence of the nonhydrolyzable organic radical such as R¹, for example, a sol-gel composition of this kind used in accordance with the invention may also be termed a "sol-gel hybrid composition". Suitable sol-gel compositions are well known in the state of the art.

The method of the invention preferably further comprises a step (3) in which the substrate obtained after step (1) and/or (2) is rinsed with water and/or with ultrafiltrate. The term "ultrafiltrate" or "ultrafiltration", particularly in connection with electrodeposition coating, is familiar to the skilled person and is defined, for example, in Römpp Lexikon, Lacke and Druckfarben, Georg Thieme Verlag 1998.

The implementation of step (3) permits the recycling of excess constituents of the inventively employed aqueous electrocoating material (ECM), present after step (1) on the at least partly coated substrate, into the dip-coating bath.

The method of the invention may further comprise an optional step (4) in which the substrate obtained after step (1) and/or step (2) and/or step (3) is contacted with water and/or ultrafiltrate, preferably over a duration of 30 seconds up to one hour, more preferably over a duration of 30 seconds up to 30 minutes.

The method of the invention may further comprise an optional step (5) in which the substrate obtained after step (1) and/or step (2) and/or step (3) and/or step (4) is contacted with an aqueous solution or dispersion, preferably an aqueous solution, of at least one crosslinking catalyst, preferably of at least one crosslinking catalyst which is suitable for crosslinking the reactive functional groups of the binder (B1), more particularly of an epoxide-based polymeric resin and/or acrylate-based polymeric resin used as binder (B). The aqueous solution of the at least one crosslinking catalyst is preferably an aqueous solution of a bismuth compound such as, for example, an aqueous solution comprising a compound containing trivalent bismuth. During the implementation of the optional step (5), a cathodic voltage relative to an anode is preferably applied to the electrically conductive substrate used, more preferably in a range from 4 V to 100 V. Carrying out step (5) permits efficient crosslinking in the case where the amount of dissolved bismuth after implementation of step (1a) is too small to be deposited in step (1b). The optional step (5), though possible in principle, is not preferred, however, because a crosslinking catalyst in the form of dissolved and undissolved bismuth is already present in the electrocoating material to ensure sufficient crosslinking during curing without the use of further crosslinking catalysts.

In one preferred embodiment, the method of the invention further comprises at least one step (6), in which the substrate obtained after step (1) and/or (2) and/or (3) and/or (4) and/or (5) is cured. Curing is carried out preferably by means of baking and preferably takes place preferably in an oven. The curing here takes place preferably at a substrate temperature in the range from 140° C. to 200° C., more preferably in a range from 150° C. to 190° C., very preferably in a range from 160° C. to 180° C. Step (6) takes place preferably over a duration of at least 2 minutes to 2 hours, more preferably over a duration of at least 5 minutes to 1 hour, very preferably over a duration of at least 10 minutes to 30 minutes.

In one preferred embodiment the method of the invention further comprises at least one step (7), in which at least one further coating film is applied to the substrate obtained after step (1) and/or (2) and/or (3) and/or (4) and/or (5), but preferably after step (6).

By means of step (7) it is possible for one or more further coating films to be applied to the substrate at least partly coated with the electrocoating material (ECM) obtained after step (1) and/or (2) and/or (3) and/or (4) and/or (5) and/or (6), preferably (6). If two or more coats have to be applied, step (7) may be repeated accordingly. Examples of further coating films for application are, for example, basecoat films, surfacer films and/or single-coat or multicoat topcoat films. The aqueous electrocoating material applied in step (1), optionally after having performed steps (2) and/or (3), and/or (4) and/or (5) and/or (6), can be cured as previously described, before a further coat is applied such as a basecoat film, surfacer film and/or a single-coat or multicoat topcoat film. Alternatively, however, the aqueous electrocoating material applied in step (1), optionally after having performed steps (2) and/or (3), and/or (4) and/or (5) and/or (6), may not be cured, but instead <a further coat may be applied such as a basecoat film, surfacer film and/or a single-coat or multicoat topcoat film ("wet-on-wet method"). In this case, following application of this or these further coat(s), the overall system thus obtained is cured, it being possible for this curing to take place as described previously, preferably in accordance with a step (6).

At Least Partly Coated Substrate:

A further subject of the present invention is an electrically conductive substrate coated at least partly with the aqueous electrocoating material (ECM) of the invention, or an at least partly coated electrically conductive substrate which is obtainable by means of the method of the invention for at least partly coating an electrically conductive substrate with a coating composition of the invention, thus preferably with an electrocoat material.

A further subject of the present invention is a preferably metallic component or preferably metallic article each produced from at least one such substrate.

Such articles may be, for example, metal strips. Components of this kind may also however—and preferably in the context of the present invention—be bodies and bodywork parts of vehicles such as automobiles, trucks, motorcycles, buses, and coaches, and components of electrical household products, or else components from the area of apparatus claddings, façade claddings, ceiling claddings, or window profiles.

What has been said about the aqueous electrocoating material (ECM) according to the invention and the inventive method applies mutatis mutandis with respect to further preferred embodiments of the coated substrate and component or article according to the invention.

The invention is described in particular by the following embodiments: Embodiment 1: aqueous electrocoating material (ECM), comprising—based on the total weight of the electrocoating material—
 (a) at least one binder (B) containing cationic or anionic groups and reactive functional groups which are able to undergo crosslinking reactions with complementary reactive functional groups present in a crosslinking agent (CA), (b) at least one crosslinking agent (CA) containing fully blocked isocyanate groups and at least one silane group;
(c) at least 100 ppm bismuth;
(d) at most 300 ppm of dissolved lithium; and
(e) optionally at least one additive (AD);
characterized in that
the at least one crosslinking agent (CA) is prepared by
(i) reacting 0.01 to 5 mol-% of the total amount of free isocyanate groups present in at least one parent structure P with at least one compound of general formula (I)

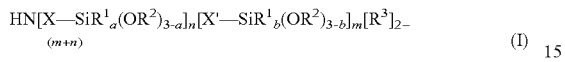

(I)

wherein
X, X' represent, independently from each other, linear and/or branched alkylene or cycloalkylene radicals having 1 to 20 carbon atoms;
$R^1$ represents an alkyl, cycloalkyl, aryl, or aralkyl group, it being possible for the carbon chain to be interrupted by nonadjacent oxygen, sulfur, or $NR_a$ groups, where $R_a$ is alkyl, cycloalkyl, aryl, or aralkyl;
$R^2$ represents hydrogen, an alkyl, or a cycloalkyl group, it being possible for the carbon chain to be interrupted by nonadjacent oxygen, sulfur or $NR_a$ groups, where $R_a$ is alkyl, cycloalkyl, aryl, or aralkyl;
$R^3$ represents a linear and/or branched alkylene or cycloalkylene radicals having 1 to 20 carbon atoms;
n,m are, independently from each other, 1 or m is 1 and n is 0; and
a,b are, independently from each other 0 to 2;
(ii) reacting the free isocyanate groups of the parent structure P remaining after step
(i) with at least one blocking agent BA to obtain the compound (X) comprising fully blocked isocyanate and silane groups; and
(iii) optionally diluting the crosslinking agent obtained in step (ii) with at least one solvent.

Embodiment 2: aqueous electrocoating material (ECM) according to embodiment 1, characterized in that that the at least one binder (B) contains cationic groups.

Embodiment 3: aqueous electrocoating material (ECM) according to embodiment 1 or 2, characterized in that the that the cationic groups are tertiary amino groups which, independently of one another, have at least two $C_1$-$C_3$ alkyl or $C_1$-$C_3$ hydroxy alkyl groups.

Embodiment 4: aqueous electrocoating material (ECM) according to any of the preceding embodiments, characterized in that the reactive functional groups of the at least one binder (B) are hydroxyl groups.

Embodiment 5: aqueous electrocoating material (ECM) according to any of the preceding embodiments, characterized in that the at least one parent structure P has an average isocyanate functionality of 2 to 6, preferably of 2 to 5, more preferably of 2 to 4, very preferably of 2.5 to 3.

Embodiment 6: aqueous electrocoating material (ECM) according to any of the preceding embodiments, characterized in that the at least one parent structure P is selected from the group consisting of (i) aromatic, aliphatic, cycloaliphatic or heterocyclic polyisocyanates; (ii) polyisocyanates derived from said aromatic, aliphatic, cycloaliphatic or heterocyclic polyisocyanates by trimerization, dimerization, urethane formation, biuret formation, uretdione formation and/or allophanate formation; and (iii) mixtures thereof, preferably aromatic polyisocyanates.

Embodiment 7: aqueous electrocoating material (ECM) according to any of the preceding embodiments, characterized in that the at least one parent structure P is a polyisocyanate of the general formula (II)

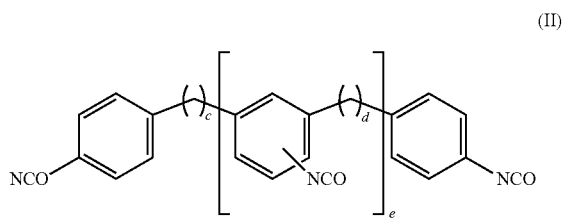

(II)

wherein
c, d are, independently from each other, integral numbers of 1 to 5, preferably 1 to 3, very preferably 1; and
e is 0 to 4, preferably 0 or 1 to 4.

Embodiment 8: aqueous electrocoating material (ECM) according to any of the preceding embodiments, characterized in that the parent structure P is a mixture of a first polyisocyanate P1 and a second polyisocyanate P2.

Embodiment 9: aqueous electrocoating material (ECM) according to embodiment 8, characterized in that the of a first polyisocyanate P1 is a polyisocyanate of general formula (II) with c=1 and e=0 and the second polyisocyanate P2 is a polyisocyanate of general formula (II) with c=d=1 and e=1 to 4.

Embodiment 10: aqueous electrocoating material (ECM) according to any of the preceding embodiments, characterized in that X and X' in formula (I) represent, independently from each other, a linear alkylene radical having 1 to 10, preferably 1 to 6, more preferably 2 to 5, very preferably 3, carbon atoms.

Embodiment 11: aqueous electrocoating material (ECM) according to any of the preceding embodiments, characterized in that $R^2$ in formula (I) represent, independently from each other, a $C_1$-$C_{10}$ alkyl group, preferably a $C_1$-$C_6$ alkyl group, very preferably a $C_1$ alkyl group.

Embodiment 12: aqueous electrocoating material (ECM) according to any of the preceding embodiments, characterized in that $R^3$ in formula (I) represents a linear $C_1$-$C_{10}$ alkyl group, preferably a linear $C_1$-$C_6$ alkyl group, very preferably a linear $C_4$ alkyl group.

Embodiment 13: aqueous electrocoating material (ECM) according to any of the preceding embodiments, characterized in that a and b in formula (I) are, independently from each other, 0.

Embodiment 14: aqueous electrocoating material (ECM) according to any of the preceding embodiments, characterized in that 0.5 to 4.5 mol-%, preferably 0.5 to 4 mol-%, more preferably 0.5 to 3. mol-%, very preferably 0.7 to 2.5 mol-%, of the total amount of free isocyanate groups present in the at least one parent structure P are reacted in step (i) with at least one compound of general formula (I).

Embodiment 15: aqueous electrocoating material (ECM) according to any of the preceding embodiments, characterized in that a bismuth catalyst of general formula (III) is used in step (i)

(III)

wherein
c is 5 to 15, preferably 7 to 13, very preferably n=7.

Embodiment 16: aqueous electrocoating material (ECM) according to any of the preceding embodiments, characterized in that 95 to 99.99 mol-%, preferably 95.5 to 99.5 mol-%, more preferably 96 to 99.5 mol-%, even more preferably 97 to 99.5 mol-%, very preferably 97.5 to 99.3 mol-%, of the total amount of free isocyanate groups present in the parent structure P are reacted in step (ii) with at least one blocking agent BA.

Embodiment 17: aqueous electrocoating material (ECM) according to any of the preceding embodiments, characterized in that the at least one blocking agent BA is selected from the group consisting of (i) $C_1$-$C_4$ dialkyl malonates; (ii) ketoximes such as methyl ethyl ketoxime, methyl amyl ketoxime and methyl isobutyl ketoxime; (iii) alcohols such as butylglycol, di(propylene glycol) methyl ether, isopropanol or tert-butanol; (iv) oximes such as formaldoxime, acetaldoxime, butanone oxime, cyclohexanone oxime, acetophenone oxime, benzophenone oxime or diethyl glyoxime; (v) lactams such as ε-caprolactam or δ-valerolactam; (vi) phenols such as phenol or cresol; (vii) N-alkyl amides such as N-methyl acetamide; (viii) imides such as phthalimide; (ix) imidazole; (x) $C_1$-$C_{12}$ alkyl or alkoxyalkyl esters of acetoacetic acid; (xi) pyrazoles and triazoles such as 1,2-pyrazole, 3,5-dimethyl pyrazole or 1,2,4-triazole; (xii) secondary amines such as diisopropyl amine; and (xiii) mixtures thereof, preferably alcohols.

Embodiment 18: aqueous electrocoating material (ECM) according to any of the preceding embodiments, characterized in that the at least one blocking agent BA is selected from primary and/or secondary alcohols of general formula (IV)

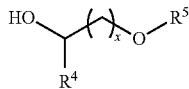

wherein
x is 1 to 5, preferably 1,
$R^4$ represents hydrogen or a $C_1$-$C_4$ alkyl residue, preferably hydrogen or a $C_1$ alkyl residue;
$R^5$ represents a linear or branched $C_1$-$C_{10}$ alkyl residue or a residue *—$(CH_2)_y$—$CH(CH_3)$—O—$R^6$ attached via * to the oxygen atom, preferably a linear $C_4$ alkyl residue or a residue*—$(CH_2)_y$—$CH(CH_3)$—O—$R^6$ attached via * to the oxygen atom;
$R^6$ represents a $C_1$-$C_4$ alkyl residue, preferably a $C_1$ alkyl residue; and
y is 1 to 5, preferably 1.

Embodiment 19: aqueous electrocoating material (ECM) according to any of the preceding embodiments, characterized in that a first blocking agent BA1 and a second blocking agent BA2 are used in step (ii).

Embodiment 20: aqueous electrocoating material (ECM) according to embodiment 19, characterized in that the first blocking agent BA1 is a compound of general formula (IV) with x=1, $R^4$=H and $R^5$=$C_4$ alkyl and the second blocking agent BA2 is a compound of general formula (IV) with x=1, $R^4$=$CH_3$, $R^5$=*—$(CH_2)_y$—$CH(CH_3)$—O—$R^6$, $R^6$=$CH_3$ and y=1.

Embodiment 21: aqueous electrocoating material (ECM) according to embodiments 19 or 20, characterized in that 50 to 75 mol-%, preferably 60 to 70 mol-%, very preferably 66 to 69 mol-%, of the total amount of free isocyanate groups present in the at least one parent structure P are reacted in step (ii) with the first blocking agent BA1.

Embodiment 22: aqueous electrocoating material (ECM) according to any of embodiments 19 to 21, characterized in that 20 to 35 mol-%, preferably 25 to 35 mol-%, very preferably 28 to 30 mol-%, of the total amount of free isocyanate groups present in the at least one parent structure P are reacted in step (ii) with the second blocking agent BA2.

Embodiment 23: aqueous electrocoating material (ECM) according to any of the preceding embodiments, characterized in that the solvent used in step (iii) is selected from the group consisting of secondary alcohols and/or ethers, preferably butoxy propanol, phenoxy propanol and bis(2-(2-butoxyethoxy)ethoxy)methane.

Embodiment 24: aqueous electrocoating material (ECM) according to any of the preceding embodiments, characterized in that the crosslinking agent (CA) has a weight average molecular weight $M_w$ of 1,000 to 2,500 g/mol, preferably 1,200 to 2,000 g/mol, very preferably 1,300 to 1,500 g/mol, as determined by gel permeation chromatography according to ISO 13885-1:2008-08.

Embodiment 25: aqueous electrocoating material (ECM) according to any of the preceding embodiments, characterized in that the crosslinking agent (CA) has a number average molecular weight $M_n$ of 900 to 1,500 g/mol, preferably 950 to 1,100 g/mol, very preferably 970 to 1,050 g/mol, as determined by gel permeation chromatography according to ISO 13885-1:2008-08.

Embodiment 26: aqueous electrocoating material (ECM) according to any of the preceding embodiments, characterized in that the crosslinking agent (CA) has a viscosity (60% by weight of a solution in butoxy propanol) of 200 to 350 mPa*s, preferably of 215 to 300 mPa*s, as determined with a Brookfield CAP2000+ viscosimeter, cone plate configuration, cone CAP 03, at 23° C. and a shear rate of 5,000 $s^{-1}$.

Embodiment 27: aqueous electrocoating material (ECM) according to any of the preceding embodiments, characterized in that the crosslinking agent (CA) has a viscosity (60% by weight of a solution in butoxy propanol) of 200 to 350 mPa*s, preferably of 215 to 300 mPa*s, as determined with a Brookfield CAP2000+ viscosimeter, cone plate configuration, cone CAP 03, at 23° C. and a shear rate of 5,000 $s^{-1}$.

Embodiment 28: aqueous electrocoating material (ECM) according to any of the preceding embodiments, characterized in that the at least one crosslinking agent (CA) is present in a total amount of 10 to 50 parts by weight, preferably 25 to 40 parts by weight, based on 100 parts by weight of binder (B).

Embodiment 29: aqueous electrocoating material (ECM) according to any of the preceding embodiments, characterized in that the electrocoating material (ECM) comprises—based on the total weight of the electrocoating material (ECM)— a total amount of at least 300 ppm of bismuth, including
at least 100 ppm of dissolved bismuth and
at least 200 ppm of undissolved bismuth.

Embodiment 30: aqueous electrocoating material (ECM) according to any of the preceding embodiments, characterized in that the total amount of the bismuth is in a range from 130 ppm to 20 000 ppm, more preferably in a range from 150 ppm to 15 000 ppm, very preferably in a range from 200 ppm to 10 000 ppm, especially preferably in a range from 500 ppm to 10 000 ppm or in a range from 500 to 20 000 ppm or in a range from 1000 ppm to 10 000 ppm or in a range from 1000 ppm to 5000 ppm or in a range from 500 ppm to 3000 ppm, based in each case on the total weight of the electrocoating material (ECM).

Embodiment 31: aqueous electrocoating material (ECM) according to any of the preceding embodiments, characterized in that the amount of dissolved bismuth is preferably at least 50 ppm, more preferably at least 75 ppm, very preferably at least 100 ppm or at least 200 ppm, more particularly at least 250 ppm, based in each case on the total weight of the electrocoating material (ECM).

Embodiment 32: aqueous electrocoating material (ECM) according to any of the preceding embodiments, characterized in that the fraction of undissolved bismuth based on the total amount of the bismuth contained in the electrocoating material (ECM) is preferably at least 10 mol % to 98 mol %, more preferably at least 20 mol % to 97 mol %, even more preferably at least 35 mol % to 96 mol %, very preferably 70 mol % to 95 mol %

Embodiment 33: aqueous electrocoating material (ECM) according to any of the preceding embodiments, characterized in that the electrocoating material (ECM) comprises at least one at least bidentate complexing agent suitable for complexation of bismuth, preferably selected from the group consisting of ethylenediaminetetraacetic acid, lactic acid, N,N,N',N'-tetrakis-2-hydroxypropylethylenediamine, N,N'-bis(2-hydroxyethyl)glycine, and N,N,N',N'-tetrakis-2-hydroxyethylethylenediamine, very preferably N,N'-bis(2-hydroxyethyl)glycine (bicine).

Embodiment 34: aqueous electrocoating material (ECM) according to embodiment 33, characterized in that the electrocoating material (ECM) comprises the at least one at least bidentate complexing agent in an amount of at least 7.5 mol % or at least 10 mol %, more preferably in a fraction of at least 15 mol % or at least 20 mol %, very preferably in a fraction of at least 30 mol % or at least 40 mol %, more particularly in a fraction of at least 50 mol %, based in each case on the total amount of the bismuth present in the electrocoating material (ECM).

Embodiment 35: aqueous electrocoating material (ECM) according to any of the preceding embodiments, characterized in that the total amount of dissolved lithium is from 2.5 to 250 ppm, 5 to 200 ppm, 7.5 to 150 ppm, 10 to 100 ppm, 12.5 to 70 ppm, 12.5 to 50 ppm or 12.5 to 40 ppm, or 12.5 to 30 ppm, based in each case on the total weight of the electrocoating material (ECM).

Embodiment 36: aqueous electrocoating material (ECM) according to any of the preceding embodiments, characterized in that it further comprises copper.

Embodiment 37: aqueous electrocoating material (ECM) according to embodiment 36, characterized in that copper is included in dissolved form and the total amount of dissolved copper is from 5 to 1000 ppm, preferably 10 to 750 ppm, more preferably 15 to 500 ppm or else 20 to 250 ppm, based in each case on the total weight of the electrocoating material (ECM).

Embodiment 38: aqueous electrocoating material (ECM) according to any of the preceding embodiments, characterized in that the at least one additive (AD) is selected from the group consisting of catalysts, pigments, anticrater additives, polyvinyl alcohols, thermally curable reactive diluents, molecularly dispersedly soluble dyes, light stabilizers, such as UV absorbers and reversible free-radical scavengers (HALS), antioxidants, low-boiling and high-boiling ("long") organic solvents, devolatilizers, wetting agents, emulsifiers, slip additives, polymerization inhibitors, thermolabile free-radical initiators, adhesion promoters, flow control agents, film-forming assistants, flame retardants, corrosion inhibitors, free-flow aids, waxes, siccatives, biocides, matting agents, inorganic and organic salts and mixtures thereof, preferably of pigments.

Embodiment 39: aqueous electrocoating material (ECM) according to embodiment 38, characterized in that at least one additive (AD) is present in a total amount of 0.1 to 20 wt. %, more preferably 0.1 to 15 wt. %, very preferably 0.1 to 10 wt. %, especially preferably 0.1 to 5 wt. %, and more particularly 0.1 to 2.5 wt. %, based in each case on the total weight of the aqueous electrocoating material (ECM).

Embodiment 40: method for at least partly coating an electrically conductive substrate with an electrocoat material, comprising at least a step (1),
(1) contacting the electrically conductive substrate, connected as cathode, with the aqueous electrocoating material (ECM) according to any of embodiments 1 to 39, step (1) being carried out in at least two successive steps (1a) and (1b), namely
(1a) at an applied voltage in a range from 1 to 50 V, which is applied over a duration of at least 5 seconds, and
(1b) at an applied voltage in a range from 50 to 400 V, with the proviso that the voltage applied in step (1b) is greater by at least 10 V than the voltage applied in step (1a).

Embodiment 41: method according to embodiment 40, characterized in that the electrically conductive substrates is selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminumized steel, aluminum, and magnesium, preferably galvanized steel and aluminum.

Embodiment 42: method according to embodiment 40 or 41, characterized in that the electrically conductive substrate is not a phosphatized or chromated substrate or a substrate treated with a pretreatment composition comprising at least one water-soluble compound comprising at least one Ti atom and/or at least one Zr atom and which comprises at least one water-soluble compound as a source of fluoride ions, comprising at least one fluorine atom, or with an aqueous pretreatment composition which comprises a water-soluble compound obtainable by reaction of at least one water-soluble compound comprising at least one Ti atom and/or at least one Zr atom with at least one water-soluble compound as a source of fluoride ions, comprising at least one fluorine atom.

Embodiment 43: method according to any of embodiments 40 to 42, characterized in that the electrically conductive substrate in relation to the type of metal has different regions, more particularly at least one region which is steel-based and at least one further region which is aluminum-based.

Embodiment 44: method according to any of embodiments 40 to 43, characterized in that step (1) is carried out in a dip bath at a dip bath temperature of 20 to 45° C., more preferably of 22 to 42° C., very preferably of 24 to 41° C., especially preferably of 26 to 40° C., with more particular preference of 27 to 39° C., such as 28 to 38° C.

Embodiment 45: method according to any of embodiments 40 to 44, characterized in that the aqueous electrocoating material (ECM) is applied in step (1) such that the resulting electrocoat film has a dry film thickness in the range from 5 to 40 µm, more preferably from 10 to 30 µm, especially preferably from 20 to 25 µm.

Embodiment 46: method according to any of embodiments 40 to 45, characterized in that the voltage applied in step (1a) is in a range from 2 to 45 V or in a range from 2 to 40 V or in a range from 2 to 35 V or in a range from 2 to 30 V or in a range from 3 to 25 V or in a range from 3 to 20 V or in a range from 3 to 15 V or in a range from 3 to 10 V or in a range from 3 to 6 V.

Embodiment 47: method according to any of embodiments 40 to 46, characterized in that the voltage is applied in step (1a) over a duration in a range from at least 5 to 500 seconds or from 5 to 500 seconds or from 10 to 500 seconds or from 10 to 300 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

Embodiment 48: method according to any of embodiments 40 to 47, characterized in that the deposition current density in step (1a) is at least 1 A/m$^2$, more preferably at least 2 A/m$^2$, and more particularly at least 3 A/m$^2$, but preferably in each case not more than 20 A/m$^2$, more preferably in each case not more than 10 A/m$^2$.

Embodiment 49: method according to any of embodiments 40 to 48, characterized in that the voltage applied in step (1b) is in a range from 55 to 400 V or in a range from 75 to 400 V or in a range from 95 to 400 V or in a range from 115 to 390 V or in a range from 135 to 370 V or in a range from 155 to 350 V or in a range from 175 to 330 V or in a range from 195 to 310 V or in a range from 215 to 290 V.

Embodiment 50: method according to any of embodiments 40 to 49, characterized in that step (1 b) is performed after a time interval of 0 to 300 seconds after implementation of step (1a).

Embodiment 51: method according to any of embodiments 40 to 50, characterized in that the voltage is applied in step (1 b) over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

Embodiment 52: method according to any of embodiments 40 to 51, characterized in that the substrate obtained after the implementation of step (1) is cured, preferably at a substrate temperature in the range from 140° C. to 200° C., more preferably in a range from 150° C. to 190° C., very preferably in a range from 160° C. to 180° C. over a duration of at least 2 minutes to 2 hours, more preferably over a duration of at least 5 minutes to 1 hour, very preferably over a duration of at least 10 minutes to 30 minutes Embodiment 53: coated substrate coated by the method according to embodiments 40 to 52.

Embodiment 54: component or article, more particularly automobile body, which comprises the coated substrate according to embodiment 53.

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:

1.1 Solids Content (Solids, Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 130° C. for 60 minutes, cooling it in a desiccator and then reweighing it. The residue relative to the total amount of sample used corresponds to the nonvolatile fraction.

1.2 Determination of Viscosity

The viscosity of compounds (X) as well as the binder resin used to prepare the aqueous electrocoating materials was determined at 23° C. using a shear rate of 10,000 s$^{-1}$ or 5,000 s$^{-1}$ according to DIN EN ISO 3219:1994-10 and DIN 53019-2:2001-02 with a Brookfield CAP2000+ viscosimeter; cone plate configuration; Cone CAP 03.

The viscosity of aqueous electrocoating materials was determined at 23° C. using a shear rate of 150 s$^{-1}$ according to DIN EN ISO 3219:1994-10 and DIN 53019-2:2001-02 with a Rotation viscosimeter Rheolab QC; cylinder geometry; cylinder Z3.

1.3 Determination of Molecular Weight

The molecular weight of the compounds (X) was determined according to ISO 13885-1:200801 using polystyrene standards for calibration as well as the following equipment and parameters:

Agilent 1100 series including pump, automatic sampler and refractive index detector PSS-WIN GPC computer aided system Columns: combination of PSS SDV 5 µm 10e5/10e4/10e3, 300 mm, 8 mm ID Eluent: tetrahydrofuran with 0.1 mol/l acetic acid Injector volume: 100 µl; temperature: 35° C.; flow rate: 1.0 ml/min; run time: 40 min.

1.4. Atomic Emission Spectrometry (ICP-OES) for Determining the Amounts of Dissolved Bismuth, Undissolved Bismuth, Dissolved Lithium, Copper Such as Especially Dissolved Bismuth The amount of certain elements in a sample under investigation, such as the bismuth content, for example, is determined using inductively coupled plasma atomic emission spectrometry (ICP-OES) according to DIN EN ISO 11885 (date: Sep. 1, 2009).

A fundamental distinction is made here between dissolved components (for example, dissolved bismuth) and undissolved components (for example undissolved bismuth). The total fraction of an element, bismuth for example, in the electrocoating material (ECM) is then obtained from the sum total of the element present in dissolved form and the element present in undissolved form. The elements present in dissolved form are determined from ultrafiltrate as follows. An ultrafiltration is carried out on an electrocoating material (ECM) at a temperature of 20° C. for the duration of six hours (ultrafiltration in a circuit; ultrafiltration membrane: Nadir, PVDF, RM-UV 150T). A sample is taken from the permeate or ultrafiltrate. This sample is subjected to thermal excitation in an argon plasma generated by a high-frequency field, and the light emitted due to electron transitions becomes visible as a spectral line of the corresponding wavelength, and is analyzed using an optical system. There is a linear relation here between the intensity of the light emitted and the concentration of the element in question. Prior to implementation, using known element standards (reference standards), the calibration measurements are carried out as a function of the particular sample under investigation. These calibrations can be used to determine concentrations of unknown solutions such as the concentration of the amount of dissolved bismuth or dissolved lithium in the ultrafiltrate. It is assumed here that the components present in dissolved form in the electrocoating material (ECM) are transferred completely into the ultrafiltrate.

The above-described method of determination can be used, moreover, to determine the total fraction of the elements in the electrocoating material (ECM). For sample preparation in this case, a sample of the electrocoating material (ECM) is taken and this sample is digested by microwave to give a sample solution amenable to ICP-OES analysis: here, a sample of the electrocoating material (ECM) is weighed out, and the volatile constituents of this sample are removed by heating with a linear temperature increase from 18° C. to 130° C. over the course of one hour. An amount of up to 0.5 g of this resulting sample is admixed with a 1:1 mixture of nitric acid (65% strength) and sulfuric acid (96%) (5 ml of each of the stated acids) and then microwaved digestion is carried out using an instrument from Berghof (Speedwave IV instrument). During the digestion, the sample mixture is heated to a temperature of 250° C. over the course of 20 to 30 minutes, and this temperature is held for 10 minutes. Following the digestion, the remaining sample mixture should be a clear solution without a solids fraction. Using ICP-OES in accordance with DIN EN ISO 11885, it is then possible to determine the total amounts of the respective elements in the sample.

When the fraction present in dissolved form is subtracted from this total fraction, the dissolved fraction being determined as explained above, the result is the fraction of component that is present in undissolved form.

Of course, where the amounts of the constituents used that comprise the element for quantification are directly known, an arithmetic determination of the total content is also possible.

1.5 Determination of Acidic Acid Salt Spray Sist Test to DIN EN ISO 9227 AASS

The acidic acid salt spray mist test is used for determining the corrosion resistance of a coating on a substrate. In accordance with DIN EN ISO 9227 (date: June 2017), the acidic acid salt spray mist test is carried out for corresponding coated electrically conductive substrates, namely cold-rolled steel (CRS). The samples for investigation here are in a chamber in which there is continuous misting with a 5% common salt solution with a controlled pH in the range from 3.1 to 3.3 at a temperature of 35° C. over a duration of 1008 hours. The mist deposits on the samples under investigation, covering them with a corrosive film of salt water.

Prior to the acidic acid salt spray mist test to DIN EN ISO 9227 AASS, the coatings on the samples under investigation are scored down to the substrate with a blade incision, allowing the samples to be investigated for their level of under-film corrosion (undermining) to DIN EN ISO 4628-8 (date: Mar. 1, 2013), since the substrate corrodes along the score line during the DIN EN ISO 9227 AASS salt spray mist test.

As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

1.6 VDA Alternating Climate Test to VDA DIN EN ISO 11997-1 (January 2018, Cycle B)

This alternating climate test is used for determining the corrosion resistance of a coating on a substrate. The alternating climate test is carried out for the correspondingly coated substrate, namely cold-rolled steel (CRS). The alternating climate test here is carried out in 10 cycles. One cycle here consists of a total of 168 hours (1 week) and encompasses a) 24 hours of salt spray mist testing as per DIN EN ISO 9227 NSS (date: Sep. 1, 2012), b) followed by 8 hours of storage, including heating, as per DIN EN ISO 6270-2 of September 2005, AHT method, c) followed by 16 hours of storage, including cooling, as per DIN EN ISO 6270-2 of September 2005, AHT method, d) 3-fold repetition of b) and c) (hence in total 72 hours), and e) 48 hours of storage, including cooling, with an aerated climate chamber as per DIN EN ISO 6270-2 of September 2005, AHT method.

The respective coating on the samples under investigation is scored down to the substrate with a bladed incision prior to the implementation of the alternating climate test, thus allowing the samples to be investigated for their level of under-film corrosion (undermining) to DIN EN ISO 4628-8 (date: Mar. 1, 2013), since the substrate corrodes along the score line during the performance of the alternating climate test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

1.7. Alternating Climate Test PV 1210

This alternating climate test PV 1210 is used for determining the corrosion resistance of a coating on a substrate. The alternating climate test is carried out for corresponding coated electrically conductive substrates composed of hot-dip-galvanized steel (HDG). The alternating climate test here is carried out in 30 cycles. One cycle (24 hours) here consists of 4 hours of salt spray mist testing as per DIN EN ISO 9227 NSS (June 2017), 4 hours of storage, including cooling as per DIN EN ISO 6270-2 of September 2005 (AHT method) and 16 hours of storage, including heating, as per DIN EN ISO 6270-2 of September 2005, AHT method, at 40±3° C. and at atmospheric humidity of 100%. After each 5 cycles there is a pause of 48 hours, including cooling, as per DIN EN ISO 6270-2 of September 2005, AHT method. 30 cycles therefore correspond to a total duration of 42 days.

The respective coating on the samples under investigation is scored down to the substrate with a bladed incision prior to the implementation of the alternating climate test, thus allowing the samples to be investigated for their level of under-film corrosion (undermining) to DIN EN ISO 4628-8 (date: Mar. 1, 2013), since the substrate corrodes along the score line during the performance of the alternating climate test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

1.8 Copper-Accelerated Acetic Acid Salt Spray Mist Testing to DIN EN ISO 9227 CASS The copper-accelerated acetic acid salt spray mist test as well is used for determining the corrosion resistance of a coating on a substrate. The copper-accelerated acetic acid salt spray mist test is carried out, in accordance with DIN EN ISO 9227 CASS, for correspondingly coated, electrically conductive substrates of aluminum (AA6014 (ALU)). The samples under investigation are in a chamber in which there is continuous misting with a 5% common salt solution of controlled pH at a temperature of 50° C. over a duration of 240 hours, with copper chloride and acetic acid added to the salt solution. The mist deposits on the samples under investigation, covering them with a corrosive film of salt water.

The respective coating on the samples under investigation is scored down to the substrate with a bladed incision prior to the copper-accelerated acetic acid salt spray mist test as per DIN EN ISO 9227 CASS, thus allowing the samples to be investigated for their level of under-film corrosion (undermining) to DIN EN ISO 4628-8, since the substrate corrodes along the score line during the DIN EN ISO 9227 CASS copper-accelerated acetic acid salt spray mist test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

In addition to the undermining, the number of delamination sites on the overall surface of the panel is also reported (these being, then, nucleation points at which detachment of the coating has taken place). This number as well is stated as the average of the individual numbers from three to five individual panels.

1.9 Filiform Corrosion Test According to DIN EN 3665

The evaluation of filiform corrosion is used for the determination of the corrosion resistance of a coating on a metal substrate. The filiform corrosion test is carried out, in accordance with DIN EN 3665 (date: Aug. 1, 1998), for correspondingly coated, electrically conductive substrates of aluminum (AA6014 (ALU)). The test is carried out for 1008 h and comprises two steps. In a first step the coated test panels which have an artificial scribe are exposed to a hydrochloride acid steam for 30 min. After the first step, the coated test panels are placed in a chamber at 80% relative humidity and 40° C. for 1008 h. The occurring corrosion becomes visible as worm-like filaments that grow from the scribe. The maximum filament length is detected according to DIN EN 3665 (Procedure 3) and is an indicator for the resistance of the coating against filiform corrosion.

1.10 Determination of "Edge Cover Index"

The determination of the edge cover index is used to evaluate the coverage of a metal substrate edge with a coating.

A sliding contact (pin) is drawn along the respective test panel correspondingly coated, parallel to the edge, at a constant speed and exerting little tracking force on the panel. Between pin and substrate, there is an adjustable voltage source (0-1,000 V) with high internal resistance (10 MΩ). The voltage/time integral between pin and test panel is measured while the sliding contact travels a certain distance. This integral depends on the contact resistance between pin and substrate. The contact resistance is highly dependent on voltage; high voltage punctures occur as a function of the thickness of the isolation layers. The measurement of the voltage/time integral at different voltages provides a value for the isolation of the edge by the cured electrocoat and is therefore a measure for the edge protection achieved with the respective cured electrocoat. Measurements are performed on opposite sides of the substrate using voltages of 50 V, 100 V, 200 V, 400 V and 1,000 V. The edge cover index is representing the mean value of all voltage/time integrals obtained after measuring both sides of the corresponding test panel at all voltages previously stated.

2. Preparation of Crosslinking Agents (CA)

The following should be taken into account regarding the formulation constituents and amounts thereof as indicted in the tables hereinafter. When reference is made to a commercial product or to a preparation protocol described elsewhere, the reference, independently of the principal designation selected for the constituent in question, is to precisely this commercial product or precisely the product prepared with the referenced protocol.

The inventive crosslinking agents (CA-I1) to (CA-I4) as well as the comparative crosslinking agent (CA-C1) containing fully blocked isocyanate groups as well as silane groups were prepared using the ingredients stated in Table 1 below according to the following general procedure:

A solution of the isocyanate containing parent structure (Lupranat® M 20 S supplied by BASF SE) and the bismuth catalyst (K-Kat 348 supplied by King Industries, Inc) in Mazon 1651 (supplied by BASF SE) was heated to 37° C. before the respective silane compound of general formula (I) was added over a period of 10 minutes. After addition of the silane compound of general formula (I) was complete, a mixture of the respective blocking agents was added over a period of 3 hours while gradually warming the reaction mixture to 80° C. Then, the reaction mixture was cooled and butoxy propanol and phenoxy propanol were added to the prepared respective compound containing fully blocked isocyanate groups as well as silane groups.

TABLE 1

Ingredients to prepare inventive compounds (CA-I1) to (CA-I4) and comparative compound (CA-C1)

| # | Ingredient | CA-I1 | CA-I2 | CA-I3 | CA-I4 | CA-C1* |
|---|---|---|---|---|---|---|
| 1 | Lupranat ® M 20 S [1)] | 43.162 | 42.905 | 43.287 | 43.295 | 42.147 |
| 2 | K-Kat 348 [2)] | 0.0190 | 0.019 | 0.019 | 0.019 | 0.018 |
| 3 | Mazon 1651 | 2.514 | 2.514 | 2.514 | 2.514 | 2.514 |
| 4 | Silane compound SC1 of formula (I) [3)] | 1.820 | — | 0.912 | — | — |
| 5 | Silane compound SC2 of formula (I) [4)] | — | 2.940 | — | 1.483 | 5.776 |
| 6 | Blocking agent BA1 [5)] | 25.823 | 25.044 | 25.140 | 25.587 | 23.986 |
| 7 | Blocking agent BA2 [6)] | 14.195 | 14.111 | 15.660 | 14.635 | 13.091 |

TABLE 1-continued

Ingredients to prepare inventive compounds (CA-I1) to (CA-I4) and comparative compound (CA-C1)

| # | Ingredient | CA-I1 | CA-I2 | CA-I3 | CA-I4 | CA-C1* |
|---|---|---|---|---|---|---|
| 8 | Butoxy propanol | 6.233 | 6.234 | 6.233 | 6.233 | 6.234 |
| 9 | Phenoxy propanol | 6.233 | 6.234 | 6.233 | 6.233 | 6.234 |

*comparative

[1] mixture of polyisocyanate P1 of the general formula (II) with c = 1 and e = 0 and polyisocyanate P2 of general formula (II) with c = d = 1 and e = 1 to 4,
[2] Bismuth(III) 2-ethylhexanoate (70-75% in xylenes)
[3] X = X' = linear alkylene radical having 3 carbon atoms, $R^2 = C_1$ alkyl group, m = n = 1 and a = b = 0,
[4] X = X' = linear alkylene radical having 3 carbon atoms, $R^2 = C_1$ alkyl group, $R^3$ = linear $C_4$ alkyl group, m = 1, n = 0 and a = b = 0,
[5] compound of general formula (IV) with x = 1, $R^4$ = H and $R^5 = C_4$ alkyl,
[6] compound of general formula (IV) with x = 1, $R^4 = CH_3$, $R^5 = *-(CH_2)_y-CH(CH_3)-O-R^6$, $R^6 = CH_3$ and y = 1,

TABLE 2

Properties of prepared compounds (CA-I1) to (CA-I4) and (CA-C1)

| | CA-I1 | CA-I2 | CA-I3 | CA-I4 | CA-C1* |
|---|---|---|---|---|---|
| EQ NCO [1] | 6.0 | 6.0 | 6.0 | 6.0 | 6.0 |
| Mol.-% silane compound SC1 of formula (I) [2] | 1.7 | — | 0.83 | — | — |
| Mol.-% silane compound SC1 of formula (I) [3] | — | 3.3 | — | 1.7 | 6.7 |
| Mol.-% BA1 [4] | 68.3 | 66.7 | 66.34 | 67.5 | 65.0 |
| Mol.-% BA2 [4] | 30.0 | 30.0 | 32.83 | 30.8 | 28.3 |
| Solids content [%] | 85.7 | 85.3 | 85.7 | 85.9 | 83.2 |
| $M_w$ | 1349 | 1449 | n.d [5] | n.d [5] | n.d [5] |
| $M_n$ | 982 | 1017 | n.d [5] | n.d [5] | n.d [5] |
| Viscosity [mPa * s] (60% in butoxy propanol) | 221 | 254 | 307 | 316 | 297 |

*comparative

[1] NCO equivalents of parent structure P (Lupranat ® M 20 S) used to prepare respective compound (CA)
[2] X = X' = linear alkylene radical having 3 carbon atoms, $R^2 = C_1$ alkyl group, m = n = 1 and a = b = 0,
[3] X = X' = linear alkylene radical having 3 carbon atoms, $R^2 = C_1$ alkyl group, $R^3$ = linear $C_4$ alkyl group, m = 1, n = 0 and a = b = 0,
[4] based on the total amount of free NCO groups of the parent structure P (Lupranat ® M 20 S),
[5] not determined

3. Preparation of Aqueous Electrocoating Materials (ECM)

The aqueous electrocoating materials (ECM) were prepared by mixing an aqueous dispersion of binder and crosslinker (abbreviated as (D1)) with a pigment paste and further additives as described below.

3.1 Preparation of Aqueous Dispersion of Binder and Crosslinker (D1) Used in Electrocoating Materials

3.1.1 Comparative Aqueous Dispersions of Binder and Crosslinker (D1-C1) and (D1-C2)

The commercially available product Cathoguard® 800 from BASF Coatings GmbH having a solids content of 37.5% is used as first comparative aqueous dispersion of a binder resin and crosslinker (D1-C1).

The second comparative aqueous dispersion of a binder and crosslinker (D1-C2) is prepared according to EP 0 961 797 A1, "Binder dispersion C" with the following deviation: the crosslinking agent described in EP 0 961 797 A1 was substituted with an equal amount of crosslinker (CA-C1) prepared according to point 2 above.

3.1.2 Aqueous Dispersion of Binder and Crosslinkers (CA-I1) to (CA-I4) [(D1-I1) to (D1-I4)]

The aqueous dispersions (D1-I1) to (D1-I4) of a binder resin and crosslinking agent (CA-I1) to (CA-I6) were prepared according to EP 0 961 797 A1, "Binder dispersion C" with the following deviation: the crosslinking agent described in EP 0 961 797 A1 was substituted with an equal amount of the respective crosslinker (CA-I1) to (CA-I4) prepared according to point 2 above.

3.2 General Procedure to Prepare Aqueous Electrocoating Materials (ECM)

2736.05 g of an aqueous dispersion of a binder resin and a crosslinker (D1), 393.06 g of a pigment paste (commercially available product CathoGuard® 800 from BASF with a solid content of 65.5%), 1702.38 g of bicine (N,N'-Bis(2-hydroxyethyl)glycine) in water (77.38 g bicine in 1625 g water), 325 g of a lithium acetate solution (2.61 g lithium acetate dihydrate in 322.39 g water), 325 g of a copper nitrate solution (2.47 g copper(II)nitrate trihydrate in 322.53 g water), 32.5 g of an edge protection additive and 986 g water are added to prepare the electrocoating material (EM). The bicine solution, the lithium acetate solution and the copper nitrate solution are each prepared separately and then added to the initial charge comprising the binder resin, the crosslinker and the pigment paste. The complete mixture is stirred at 18° C. to 23° C. for 24 hours.

3.2.1 Preparation of Inventive Electrocoating Materials (ECM-I1) to (ECM-I4)

Inventive electrocoating materials (ECM-I1) to (ECM-I4) were obtained by using the aqueous dispersions of a binder resin and crosslinking agents (D1-11) to (D1-14).

The inventive electrocoating materials (ECM-I1) to (ECM-I4) each contain a total amount of 2,500 ppm bismuth (dissolved and undissolved bismuth), 1,000 ppm of dissolved copper and 27 ppm of dissolved lithium.

3.2.2 Preparation of Comparative Electrocoating Materials (ECM-C1) and (ECM-C2)

Comparative electrocoating materials (ECM-C1) and (ECM-C2) were obtained by using the comparative aqueous dispersions (D1-C1) and (D1-C2) prepared according to point 3.1.1.

4. Deposition of Electrocoating Materials (ECM-C1), (ECM-C2) and (ECM-I1) to (ECM-I4) on Various Substrates The aqueous electrocoating materials (ECM-C1), (ECM-C2) and (ECM-I1) to (ECM-I4) prepared according to point 3 were each applied as dipped coatings to various substrates. Each of the materials here is applied to the various substrates immediately after its production as described above.

Three kinds of metal test panels are used to evaluate the corrosion resistance, these being hot-dip-galvanized steel (HDG), aluminum 6014 (ALU) and cold-rolled steel (CRS).

These panels are first of all each cleaned by immersion into a bath comprising an aqueous solution comprising the commercially available product Gardoclean S5160 from Chemetall and also water (97.7 wt. %) fora duration of 2 minutes at a temperature of 60° C. The substrates cleaned in this way are subsequently rinsed with water.

Immediately thereafter, each aqueous electrocoating compositions prepared in point 3 is applied to each panel, with the respective panel being immersed in each case into a corresponding dip-coating bath comprising one of the compositions. This dip-coating bath has a respective temperature of 32° C.

Coating in the dip-coating bath is carried out by means of a two-stage deposition step comprising steps (1a) and (1b), where first of all, galvanostatically, current strengths in the range from 0.02 to 0.32 A or, potentiostatically, a voltage of 4 V are applied, in each case over a duration of 120 seconds (corresponding to stage (1a)).

Subsequent to this, stage (1b) is carried out, with application either potentiostatically of a voltage of 4 V or galvanostatically of current strengths in the range of 0.12 to 0.28 A, which in each case within stage (1b) are increased continuously, linearly, to a voltage in the range of 200-220 V, in each case over a duration of 30 seconds, by means of a voltage ramp. This respective voltage is then maintained for a duration of 90 seconds (hold time) to give (after the subsequent curing) a coating of the respective substrate in a dry film thickness of 17 to 22 micrometers. The test panels are subsequently cured for 25 minutes in an oven (175° C. unless explicitly stated otherwise).

5. Investigation of the Corrosion Prevention Effect of the Coated Substrates

The substrates obtained according to point 4 are investigated for their corrosion resistance and edge protection properties. Outstanding resistance is achieved for average underminings of around 1 mm. Moreover, differences in the absolute range by about 1 mm are difficult to evaluate technically and are therefore not meaningful. Outstanding edge protection is obtained if the mean value for the edge cover index is 100 while no edge protection is obtained if said mean value is 0. The results are shown in Tables 3 and 4.

TABLE 3

Results of corrosion tests for test panels prepared with electrocoating materials (ECM-C1), (ECM-I1) and (ECM-I2) (all values are in [mm])

| | Electrocoating material ECM used to prepare respeactive test panels | | |
|---|---|---|---|
| | ECM-C1 | ECM-I1* | ECM-I2* |
| Average undermining AASS (substrate CRS) | 7.4 | 2.3 | 3.0 |
| Average undermining VDA (substrate CRS) | 5.3 | 2.8 | 3.9 |
| Average undermining CASS (substrate ALU) | 1.3 | 1.0 | 1.0 |
| Maximum filament length FCC (substrate ALU) | 3.6 | 2.8 | 3.5 |

*inventive

TABLE 4

Results of edge protection measurements for test panels prepared with electrocoating materials (ECM-C1), (ECM-C2) and (ECM-I1) to (ECM-I4)

| | Electrocoating material ECM used to prepare respective test panels | | | | | |
|---|---|---|---|---|---|---|
| | ECM-C1 | ECM-C2 | ECM-I1* | ECM-I2* | ECM-I3* | ECM-I4* |
| Dryfilm thickness [μm] | 20.9 | 21.6 | 20.7 | 19.7 | 20.1 | 19.9 |
| Edge cover index (mean value) | 63 | 71 | 88 | 85 | 87 | 83 |

*inventive

The results shown in Tables 3 and 4 demonstrate that cured electrocoats obtained from inventive aqueous electrocoating materials (ECM-I1) and (ECM-I2) have significantly improved corrosion resistance in the AASS and VDA test and comparable corrosion resistance in all further tests when compared to cured electrocoats prepared from the comparative electrocoating material (ECM-C1) comprising a crosslinker not containing any silane compounds. Moreover, the electrocoats prepared from inventive aqueous electrocoating compositions (ECM-I1) to (ECM-I4) have a significantly improved edge protection when compared to cured electrocoats prepared from the comparative electrocoating material (ECM-C1) comprising a silane-free crosslinker and (ECM-C2) comprising a crosslinker containing more than 5 mol % of silane compounds. Thus, a higher corrosion resistance in combination with a better edge protection can be achieved if the aqueous electrocoating material comprises a fully blocked isocyanate crosslinker (CA) containing not more than 5 mol % of a silane compound.

The invention claimed is:

1. An aqueous electrocoating material (ECM), comprising—based on a total weight of the electrocoating material—

(a) at least one binder (B) containing cationic or anionic groups and reactive functional groups which are able to undergo crosslinking reactions with complementary reactive functional groups present in a crosslinking agent (CA),
(b) at least one crosslinking agent (CA) containing fully blocked isocyanate groups and at least one silane group;
(c) at least 100 ppm bismuth;
(d) at most 300 ppm of dissolved lithium; and
(e) optionally at least one additive (AD);
wherein
the at least one crosslinking agent (CA) is prepared by
(i) reacting 0.01 to 5 mol-% of a total amount of free isocyanate groups present in at least one parent structure P with at least one compound of general formula (I)

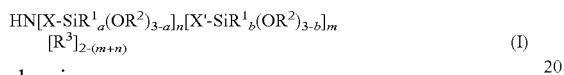

(I)

wherein
X, X' represent, independently from each other, linear and/or branched alkylene or cycloalkylene radicals having 1 to 20 carbon atoms;
$R^1$ represents an alkyl, cycloalkyl, aryl, or aralkyl group, it being possible for the carbon chain to be interrupted by nonadjacent oxygen, sulfur, or $NR_a$ groups, where $R_a$ is alkyl, cycloalkyl, aryl, or aralkyl;
$R^2$ represents hydrogen, an alkyl, or a cycloalkyl group, it being possible for the carbon chain to be interrupted by nonadjacent oxygen, sulfur or $NR_a$ groups, where $R_a$ is alkyl, cycloalkyl, aryl, or aralkyl;
$R^3$ represents a linear and/or branched alkylene or cycloalkylene radicals having 1 to 20 carbon atoms;
n,m are, independently from each other, 1 or that m is 1 and n is 0; and
a,b are, independently from each other 0 to 2;
(ii) reacting the free isocyanate groups of the parent structure P remaining after step (i) with at least one blocking agent BA to obtain the crosslinking agent (CA) comprising fully blocked isocyanate and silane groups; and
(iii) optionally diluting the crosslinking agent (CA) obtained in step (ii) with at least one solvent.

2. The aqueous electrocoating material (ECM) according to claim 1, wherein the at least one parent structure P is a polyisocyanate of the general formula (II)

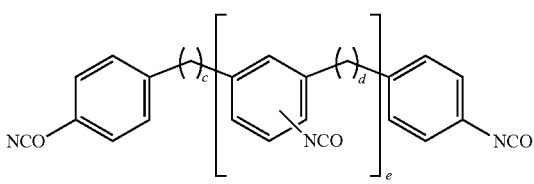

(II)

wherein
c, d are, independently from each other, integral numbers of 1 to 5; and
e is 0 to 4.

3. The aqueous electrocoating material (ECM) according to claim 1, wherein X and X' in formula (I) represent, independently from each other, a linear alkylene radical having 1 to 10.

4. The aqueous electrocoating material (ECM) according to claim 1, wherein $R^2$ in formula (I) represent, independently from each other, a $C_1$-$C_{10}$ alkyl group.

5. The aqueous electrocoating material (ECM) according to claim 1, wherein $R^3$ in formula (I) represents a linear $C_1$-$C_{10}$ alkyl group.

6. The aqueous electrocoating material (ECM) according to claim 1, wherein the at least one blocking agent BA is selected from the group consisting of primary and secondary alcohols of general formula (IV)

(IV)

wherein
X is 1 to 5,
$R^4$ represents hydrogen or a $C_1$-$C_4$ alkyl residue;
$R^5$ represents a linear or branched $C_1$-$C_{10}$ alkyl residue or a residue *—$(CH_2)_y$-$CH(CH_3)$—O—$R^6$ attached via * to the oxygen atom;
$R^6$ represents a $C_1$-$C_4$ alkyl residue; and
y is 1 to 5.

7. The aqueous electrocoating material (ECM) according to claim 1, wherein a and b in formula (I) are, independently from each other, 0.

8. The aqueous electrocoating material (ECM) according to claim 1, wherein 0.5 to 4.5 mol-% of the total amount of free isocyanate groups present in the at least one parent structure P are reacted in step (i) with at least one compound of general formula (I).

9. The aqueous electrocoating material (ECM) according to claim 1, wherein 95 to 99.99 mol-% of the total amount of free isocyanate groups present in the parent structure P are reacted in step (ii) with at least one blocking agent BA.

10. The aqueous electrocoating material (ECM) according to claim 1, wherein the electrocoating material (ECM) comprises-based on the total weight of the electrocoating material (ECM)—a total amount of at least 300 ppm of bismuth , including
at least 100 ppm of dissolved bismuth and
at least 200 ppm of undissolved bismuth.

11. The aqueous electrocoating material (ECM) according to claim 1, wherein a total amount of the bismuth is in a range from 130 ppm to ppm 20,000 ppm, based on the total weight of the electrocoating material (ECM), and the electrocoating material (ECM) comprises at least one at least bidentate complexing agent suitable for complexation of bismuth.

12. The aqueous electrocoating material (ECM) according to claim 1, wherein a total amount of dissolved lithium is from 2.5 to 250 ppm, based on the total weight of the electrocoating material (ECM).

13. A method for at least partly coating an electrically conductive substrate with an electrocoat material, comprising at least a step (1),
- (1) contacting the electrically conductive substrate, connected as cathode, with the aqueous electrocoating material (ECM) according to claim 1, said step (1) being carried out in at least two successive steps (1a) and (1b), namely
  - (1a) at an applied voltage in a range from 1 to 50 V, which is applied over a duration of at least 5 seconds, and
  - (1b) at an applied voltage in a range from 50 to 400 V, with a proviso that the voltage applied in step (1b) is greater by at least 10 V than the voltage applied in step (1a).

14. A coated substrate obtained by the method according to claim 13.

15. A component or article, which comprises the coated substrate according to claim 14.

16. An automobile body, which comprises the coated substrate according to claim 14.

17. The aqueous electrocoating material (ECM) according to claim 1, wherein the at least one parent structure P is a polyisocyanate of the general formula (II)

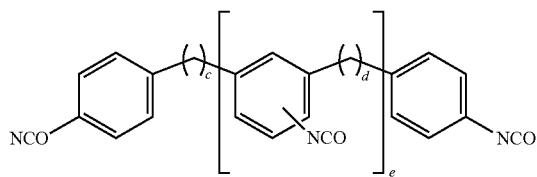

(II)

wherein
c, d are, independently from each other, integral numbers of 1 to 3; and
e is 0 to 4.

18. The aqueous electrocoating material (ECM) according to claim 1, wherein X and X' in formula (I) represent, independently from each other, a linear alkylene radical having 1 to 6 carbon atoms.

19. The aqueous electrocoating material (ECM) according to claim 1, wherein $R^2$ in formula (I) represent, independently from each other, a $C_1$-$C_6$ alkyl group.

20. The aqueous electrocoating material (ECM) according to claim 1, wherein $R^3$ in formula (I) represents a linear $C_1$-$C_6$ alkyl group.

* * * * *